(12) United States Patent
Lu et al.

(10) Patent No.: US 11,656,728 B2
(45) Date of Patent: *May 23, 2023

(54) PCAP TOUCHSCREENS WITH A COMMON CONNECTOR

(71) Applicant: Elo Touch Solutions, Inc., Milpitas, CA (US)

(72) Inventors: Zhijun Lu, Suzhou (CN); Xin Gu, Suzhou (CN); Jun Ma, Suzhou (CN)

(73) Assignee: ELO TOUCH SOLUTIONS, INC., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,790

(22) Filed: May 17, 2021

(65) Prior Publication Data

US 2021/0271345 A1 Sep. 2, 2021

Related U.S. Application Data

(63) Continuation of application No. 16/653,060, filed on Oct. 15, 2019, now Pat. No. 11,010,005.

(51) Int. Cl.
*G06F 3/045* (2006.01)
*G06F 3/044* (2006.01)
*B32B 7/12* (2006.01)

(52) U.S. Cl.
CPC ............ *G06F 3/0445* (2019.05); *B32B 7/12* (2013.01); *B32B 2255/205* (2013.01);
(Continued)

(58) Field of Classification Search
CPC ......... G06F 3/0445; G06F 2203/04103; G06F 2203/04107; G06F 3/0446; G06F 3/04164;
(Continued)

(56) References Cited

U.S. PATENT DOCUMENTS 9,158,386 B2 10/2015 Yang et al.
10,055,079 B1 8/2018 Kitchin et al.
(Continued)

OTHER PUBLICATIONS

International Search Report and Written Opinion of the International Searching Authority directed to related International Patent Application No. PCT/US2020/055210, dated Jan. 25, 2021; 12 pages.

*Primary Examiner* — Thuy N Pardo
(74) *Attorney, Agent, or Firm* — Sterne, Kessler, Goldstein & Fox P.L.L.C.

(57) ABSTRACT

Some embodiments include fabricating a narrow border of a projected capacitive (PCAP) touchscreen. Some embodiments include a vertical electrode on a cover glass coupled to a first set of traces within the narrow border, and printing a first insulating black mask (BM) layer on the cover glass, that includes a first opening above an electrode terminus of the vertical electrode. Some embodiments further include printing a portion of a conductive black via (BV) in the first opening, coupling the conductive BV to the electrode terminus and a first silver trace of the first set of silver traces. Some embodiments include combining the cover glass with a sensor glass, where the first set of silver traces substantially overlaps a second set of silver traces of the sensor glass within the narrow border, where the overlapped sets of silver traces are separated by a shield layer.

20 Claims, 22 Drawing Sheets

(52) U.S. Cl.
CPC ... *B32B 2307/202* (2013.01); *B32B 2307/206* (2013.01); *B32B 2457/208* (2013.01); *G06F 2203/04103* (2013.01); *G06F 2203/04107* (2013.01)

(58) Field of Classification Search
CPC ............... B32B 7/12; B32B 2255/205; B32B 2307/202; B32B 2307/206; B32B 2457/208
USPC ............................. 345/156, 173, 174; 349/12
See application file for complete search history.

(56) References Cited

U.S. PATENT DOCUMENTS

| | | | |
|---|---|---|---|
| 10,088,951 | B2 | 10/2018 | Shepelev et al. |
| 11,010,005 | B2 | 5/2021 | Lu et al. |
| 2004/0111017 | A1 | 6/2004 | Say et al. |
| 2006/0256095 | A1 | 11/2006 | Bottari et al. |
| 2008/0074701 | A1 | 3/2008 | Asai |
| 2009/0135156 | A1 | 5/2009 | Lowles et al. |
| 2009/0231300 | A1* | 9/2009 | Kyle ........................ G06F 3/041 345/174 |
| 2010/0000803 | A1 | 1/2010 | Yang |
| 2011/0057669 | A1* | 3/2011 | Xu ........................... G06F 3/044 324/658 |
| 2011/0199330 | A1 | 8/2011 | Hsu et al. |
| 2012/0274602 | A1* | 11/2012 | Bita ....................... G06F 3/0443 345/174 |
| 2013/0004779 | A1* | 1/2013 | Ogata .................... H01L 33/60 65/36 |
| 2013/0314626 | A1* | 11/2013 | Misaki ..................... H01B 1/16 349/12 |
| 2016/0091932 | A1* | 3/2016 | Dighde ................. G06F 1/1656 156/349 |
| 2016/0092014 | A1 | 3/2016 | Chao et al. |
| 2016/0110007 | A1* | 4/2016 | Chen ..................... G06F 3/0446 345/174 |
| 2016/0132142 | A1 | 5/2016 | Chiu et al. |
| 2016/0162080 | A1 | 6/2016 | Hayashi et al. |
| 2016/0342239 | A1* | 11/2016 | Xie ....................... G06F 3/0443 |
| 2017/0023989 | A1* | 1/2017 | Dighde ................. G06F 1/1656 |
| 2017/0090614 | A1* | 3/2017 | Kuboyama .......... G06F 1/1643 |
| 2018/0196549 | A1 | 7/2018 | Ito et al. |
| 2020/0142540 | A1 | 5/2020 | Rahmani et al. |
| 2020/0186151 | A1 | 6/2020 | Lee et al. |
| 2020/0326794 | A1* | 10/2020 | Wang ..................... B44C 3/005 |
| 2020/0333921 | A1* | 10/2020 | Kent ..................... G06F 3/0448 |
| 2020/0371636 | A1 | 11/2020 | Blondin et al. |
| 2021/0109628 | A1 | 4/2021 | Lu et al. |

\* cited by examiner

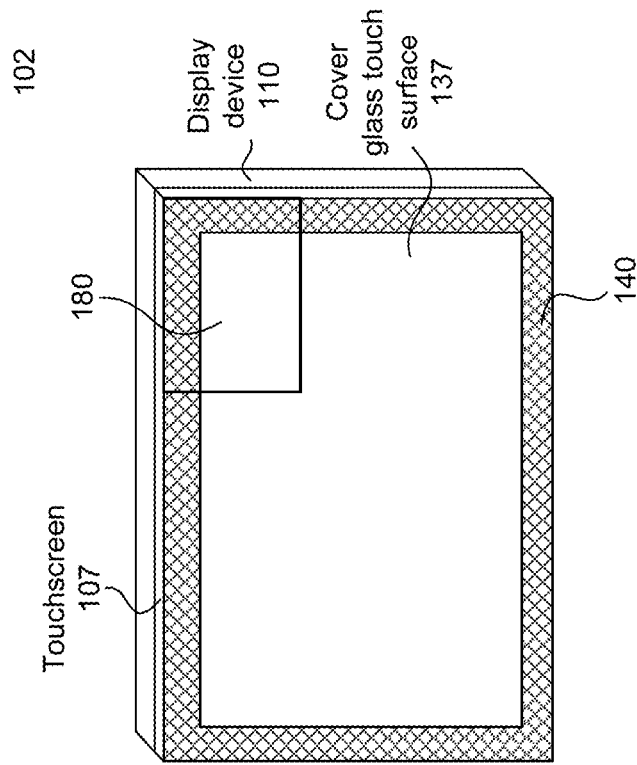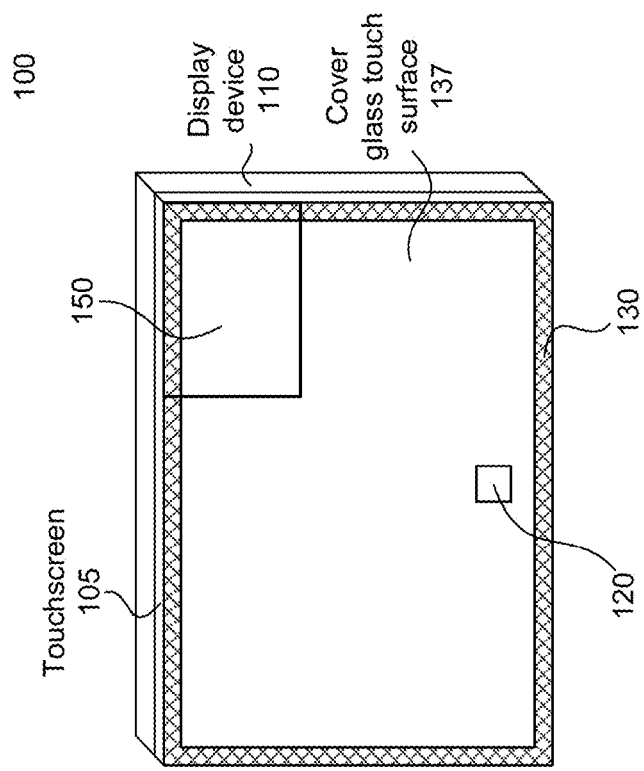

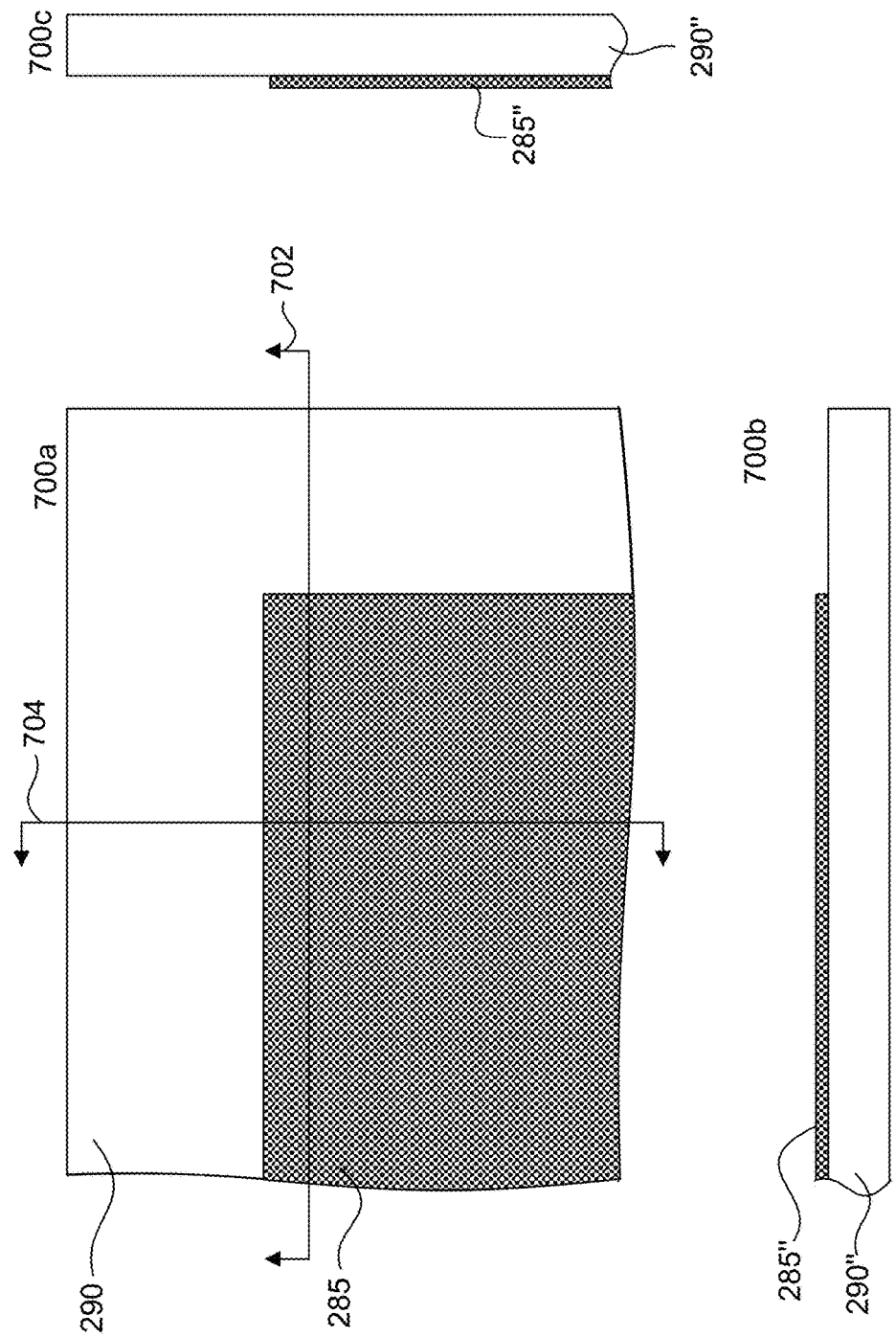

PCAP TOUCHSCREENS WITH A COMMON CONNECTOR

CROSS-REFERENCE TO RELATED APPLICATIONS

This application claims priority to U.S. Nonprovisional application Ser. No. 16/653,060, filed on Oct. 15, 2019, entitled, PCAP Touchscreens with a Narrow Border Design, which is incorporated herein by reference in its entirety.

BACKGROUND

Field

The present disclosure relates generally to projected capacitive (PCAP) touch sensitive systems, and more specifically to the border design of PCAP touchscreens.

Background Art

The ability to interact with computer applications via touch with displays is ubiquitous for today's consumers. While several touch technologies are possible to support touch interactions, each has advantages and disadvantages that tailor each for particular environments, sizes, and applications. Projected capacitive (PCAP) technology is utilized to support characteristics expected from touch interactions in touch/display interface devices.

An approach to laying out transmitter and receiver silver traces on a border of a PCAP touchscreen is to avoid overlapping of the transmitter and receiver silver traces.

SUMMARY

System, method, combination, sub-combination and other embodiments are provided for glass/glass (2GS) or glass/film/film (GFF) projected capacitive (PCAP) touchscreens and their construction. In a 2GS PCAP touchscreen, indium-tin-oxide (ITO) or equivalent on a glass is patterned by printing silver ink, and by ablating both the ITO and silver with a laser. Similarly, in a GFF PCAP touchscreen, the films are coated with ITO or equivalent, patterned by printing silver ink, and both the ITO and silver are ablated with a laser. In some embodiments, any transparent conductive film, such as silver-nanowire coating, that can be laser ablated is considered to be an equivalent to ITO. Accordingly, in the descriptions that follow, it is to be understood that "ITO" is shorthand for "ITO or equivalent".

Some embodiments include fabricating a narrow border of a PCAP touchscreen. The method may include for example, disposing on a cover glass, a first transparent electrode coupled to a first set of silver traces within the narrow border of the PCAP touchscreen. The method includes printing a first insulating black mask (BM) layer on the cover glass, where the first insulating BM layer includes a first opening above an electrode terminus of the first transparent electrode of the one or more vertical electrodes, and printing a portion of a conductive black via (BV) in the first opening, where the portion of the conductive BV may be coupled to the electrode terminus of the vertical electrode and coupled to a first silver trace of the first set of silver traces. Some embodiments include disposing on a sensor glass, a second transparent electrode parallel to the first transparent electrode, where the second transparent electrode may be coupled to a second set of silver traces. Some embodiments include combining the cover glass with the sensor glass, where the first set of silver traces substantially overlaps the second set of silver traces within the narrow border of the PCAP touchscreen, and where the overlapped sets of silver traces are separated by a shield layer.

Some embodiments for the cover glass include printing silver paste on the portion of the conductive BV and on the first insulating BM layer where transmitter and receiver silver traces are desired, and using a laser to ablate excess silver paste. Using the laser to ablate excess silver paste may include: leaving a deposit of the silver paste within a boundary of the portion of the conductive BV where the deposit is coupled to the first silver trace, and/or defining remaining silver traces of the first set of silver traces. In some embodiments, the laser ablation of the excess silver paste creates one or more second openings through the silver paste and the first insulating BM layer to the first layer, and some embodiments include printing a second insulating BM layer that fills the one or more second openings. In some embodiments, printing the second insulating BM layer includes printing the second insulating BM layer that covers the first set of silver traces except a third opening that exposes leads of the first set of silver traces that may be coupled with a connector (e.g., a flex cable connector.)

Some embodiments for the sensor glass include printing silver paste on the sensor glass where transmitter and receiver silver traces are desired, and using a laser to ablate excess silver paste. Some embodiments further include printing an insulation layer to substantially overlap the second set of silver traces, such that when the sensor glass assembly is combined with cover glass assembly, the insulation layer and the second set of silver traces are located the within the narrow border of the PCAP touchscreen. In some embodiments, the shield layer is printed on the insulation layer. In some embodiments, the printing of the silver paste on the second layer may include printing a ground silver trace, and the insulation layer may be printed around a third opening that exposes the ground silver trace to the shield layer.

In some embodiments, assembling or combining of the cover glass and the sensor glass includes applying an adhesive between the cover glass assembly and the sensor glass assembly. The adhesive may be a solid optically clear adhesive (OCA) including but is not limited to an acrylic-based adhesive, a silicone-based adhesive, polyvinyl butyral (PVB), or ethylene-vinyl acetate (EVA).

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 1A illustrates a projected capacitive (PCAP) touchscreen with a narrow border, according to an exemplary embodiment of the disclosure;

FIG. 1B illustrates a PCAP touchscreen on a display device;

FIG. 7A illustrates an example of a sensor glass with a transparent electrode layer, according to an exemplary embodiment of the disclosure;

Figure 1D:
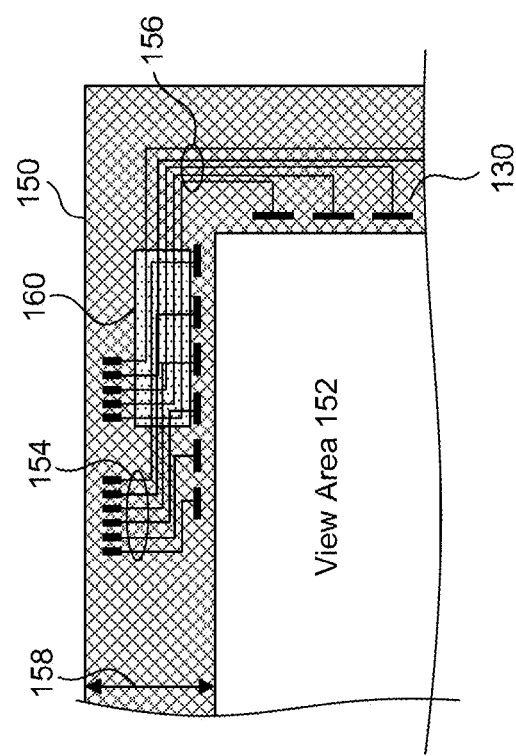
FIG. 1D illustrates a portion of a PCAP touchscreen.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Some embodiments include fabricating a narrow border of a PCAP touchscreen. FIG. 1A illustrates a projected capacitive (PCAP) touchscreen 105 with narrow border 130, according to an exemplary embodiment of the disclosure. PCAP touchscreen 105 may be placed in front of display device 110 such as a monitor, computing device, a computer, a laptop, a tablet, and/or a mobile computing device, to name just some examples. PCAP touchscreen 105 also includes a connector (not shown) that electronically couples PCAP touchscreen 105 to display device 110. A user can interact with software applications on display device 110 by touching cover sheet touch surface 137 of touchscreen 105. A portion 150 of touchscreen 105 is described further in FIG. 1C. Cross-section 120 of PCAP touchscreen 105 is described further in FIGS. 2A and 2B.

FIG. 1B illustrates a PCAP touchscreen 107 on display device 110 with a cover glass touch surface 137. Portion 180 of touchscreen 107 includes wide border 140. A portion 180 of touchscreen 107 is described further in FIG. 1D.

Figure 1C:
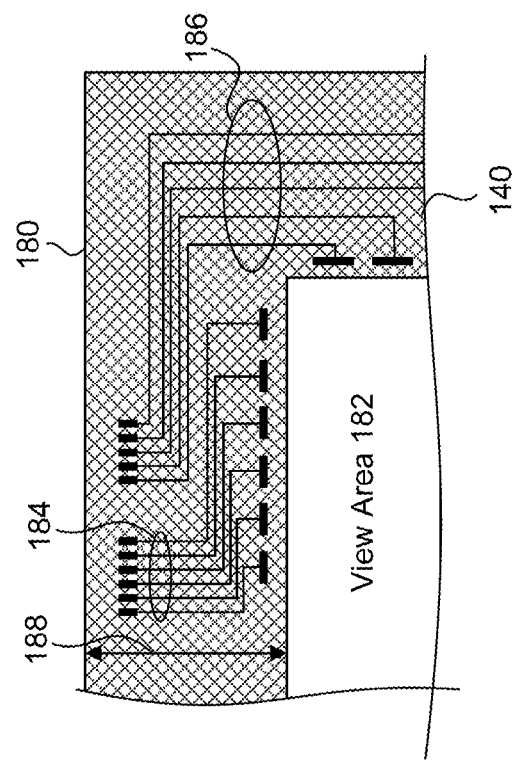
FIG. 1C illustrates a portion of a PCAP touchscreen with a narrow border, according to an exemplary embodiment of the disclosure.

FIG. 1C illustrates portion 150 of PCAP touchscreen 105 with narrow border 130, according to an exemplary embodiment of the disclosure. Portion 150 includes view area 152 where the content on display device 110 is visible to a user. First set of silver traces 154 substantially overlaps with second set of silver traces 156 and the substantial overlap occurs within narrow border 130. In addition, first set of silver traces 154 is separated from overlapping second set of silver traces 156 by shield layer 160. Shield layer 160 may include an insulation layer. Shield layer 160 and the insulation layer may be similar to shield layer 960 and insulation layer 910 described below. FIG. 1D illustrates a portion 180 of PCAP touchscreen 107. Portion 180 includes view area 182 where the content on display device 110 is visible to a user. View area 182 is smaller than view area 152. First set of silver traces 184 do no overlap with second set of silver traces 186 that are within wide border 140. The overlap of first set of silver traces 154 and second set of silver traces 156 that are separated by at least shield layer 160 enables narrow border 130 to be narrower than wide border 140. Consequently, height 158 of narrow border 130 is less than height 188 of wide border 140. The same is true of the width of narrow border 130 being less than the width of wide border 140 (not shown.)

Figure 2B:
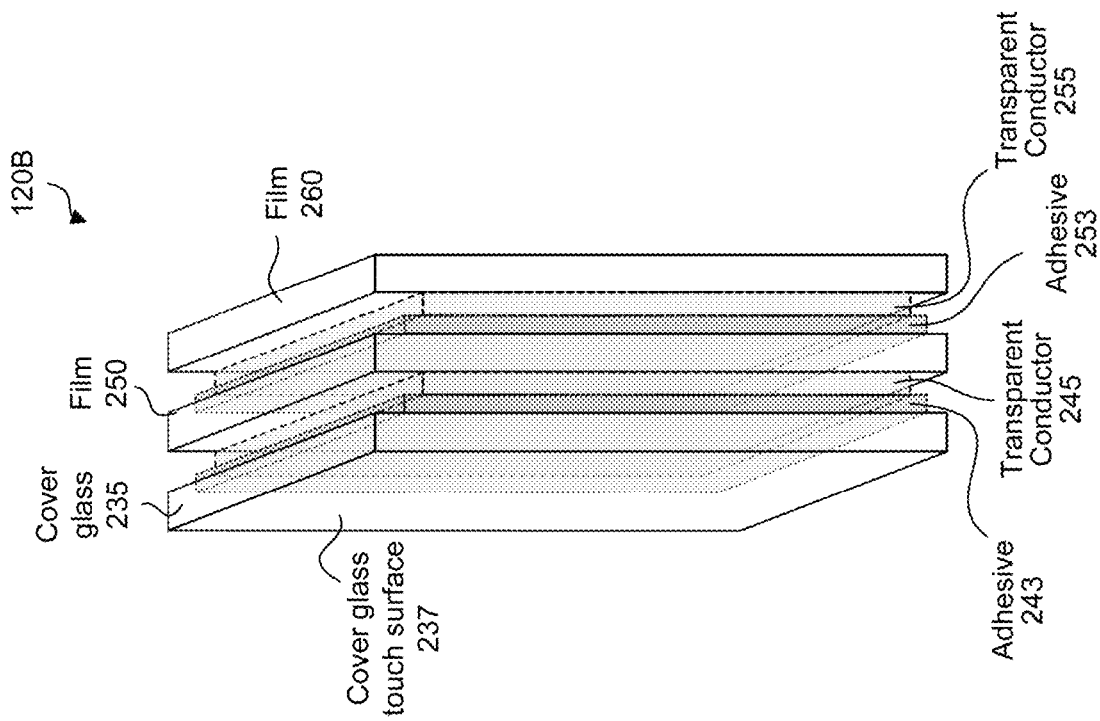
FIG. 2B illustrates a cross-section of a glass/film/film (GFF) PCAP touchscreen, according to an exemplary embodiment of the disclosure.
Figure 2A:
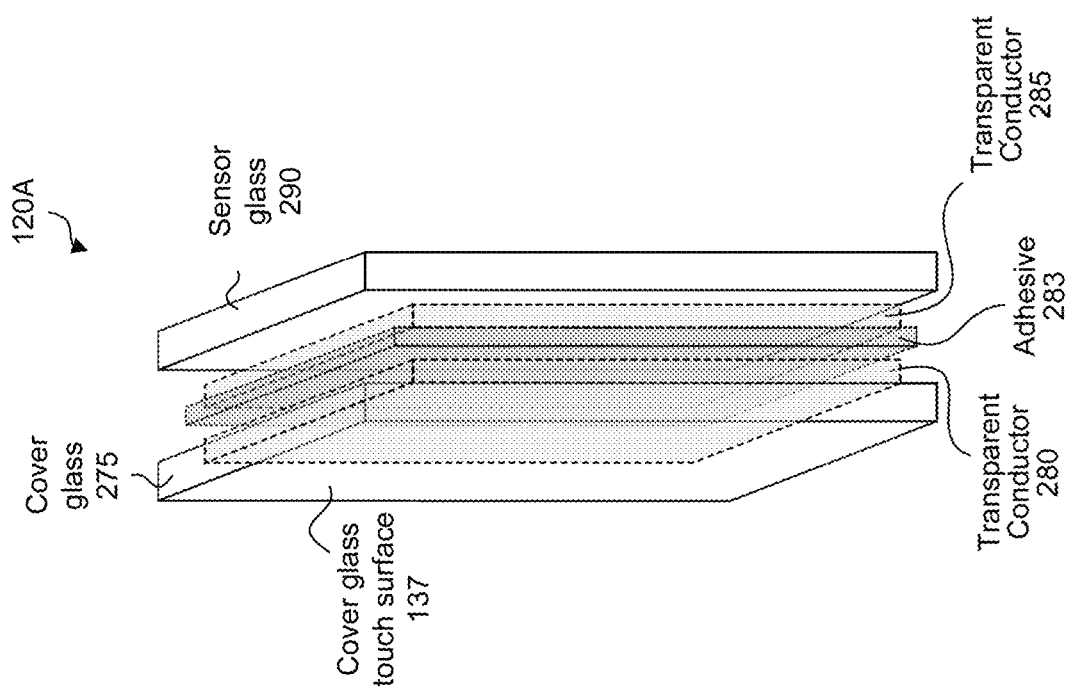
FIG. 2A illustrates a cross-section of a glass/glass (2GS) PCAP touchscreen, according to an exemplary embodiment of the disclosure.

FIG. 2A illustrates cross-section 120A of glass/glass (2GS) PCAP touchscreen 105, according to an exemplary embodiment of the disclosure. For explanation purposes, FIG. 2A may be described with elements from previous figures. Cross-section 120A may include cover glass 275, transparent conductor 280, adhesive 283, transparent conductor 285, and sensor glass 290. A user interacts with touchscreen 105 by touching cover glass touch surface 137. Information from the touch on cover glass touch surface 137 are collected via transparent conductors 280 and 285, and conveyed to display device 110 electronically. Other implementations include but are not limited to a three glass (3GS) solution in which the cover glass contains no electrodes and there are two back glasses each with electrodes.

FIG. 2B illustrates cross-section 120B of glass/film/film (GFF) PCAP touchscreen 105, according to an exemplary embodiment of the disclosure. For explanation purposes, FIG. 2B may be described with elements from previous figures. Cross-section 120B may include cover glass 235, adhesive 243, transparent conductor 245, film 250, adhesive 253, transparent conductor 255, and film 260. A user interacts with touchscreen 105 by touching cover glass touch surface 237. Information from the touch on cover glass touch surface 237 is collected via transparent conductors 245 and 255, and conveyed to display device 110 electronically.

Adhesive layers 243, 253, and 283 may be a solid optically clear adhesive (OCA) that can be an acrylic-based adhesive, a silicone-based adhesive, polyvinyl butyral (PVB), ethylene-vinyl acetate (EVA), or any other suitable OCA that will be recognized by those skilled in the relevant art(s). Transparent conductors 245, 255, 280, and 285 are circuitry layers that may include electrodes, routing traces, and trace shields of materials such as indium-tin-oxide (ITO), carbon nanotubes, graphene, silver-nanowires, silver, and/or metal mesh. (The transparent conductors 245, 255, 280, and 285 are typically microscopically thin, but for clarity they are not drawn to scale in FIGS. 2A and 2B. Furthermore, there is no air gap between adhesives and glasses (e.g., adhesive 283 and cover glass 275, adhesive 283 and sensor glass 290, adhesive 243 and cover glass 235) or adhesives and a film (e.g., adhesive 253 and film 260); adhesive 243 conforms to the inside surface of cover glass 235 and transparent conductor 245 and adhesive 253 to film 250 and transparent conductor 255 which in turn conforms to film 260 with no air gap.

Figure 3A:
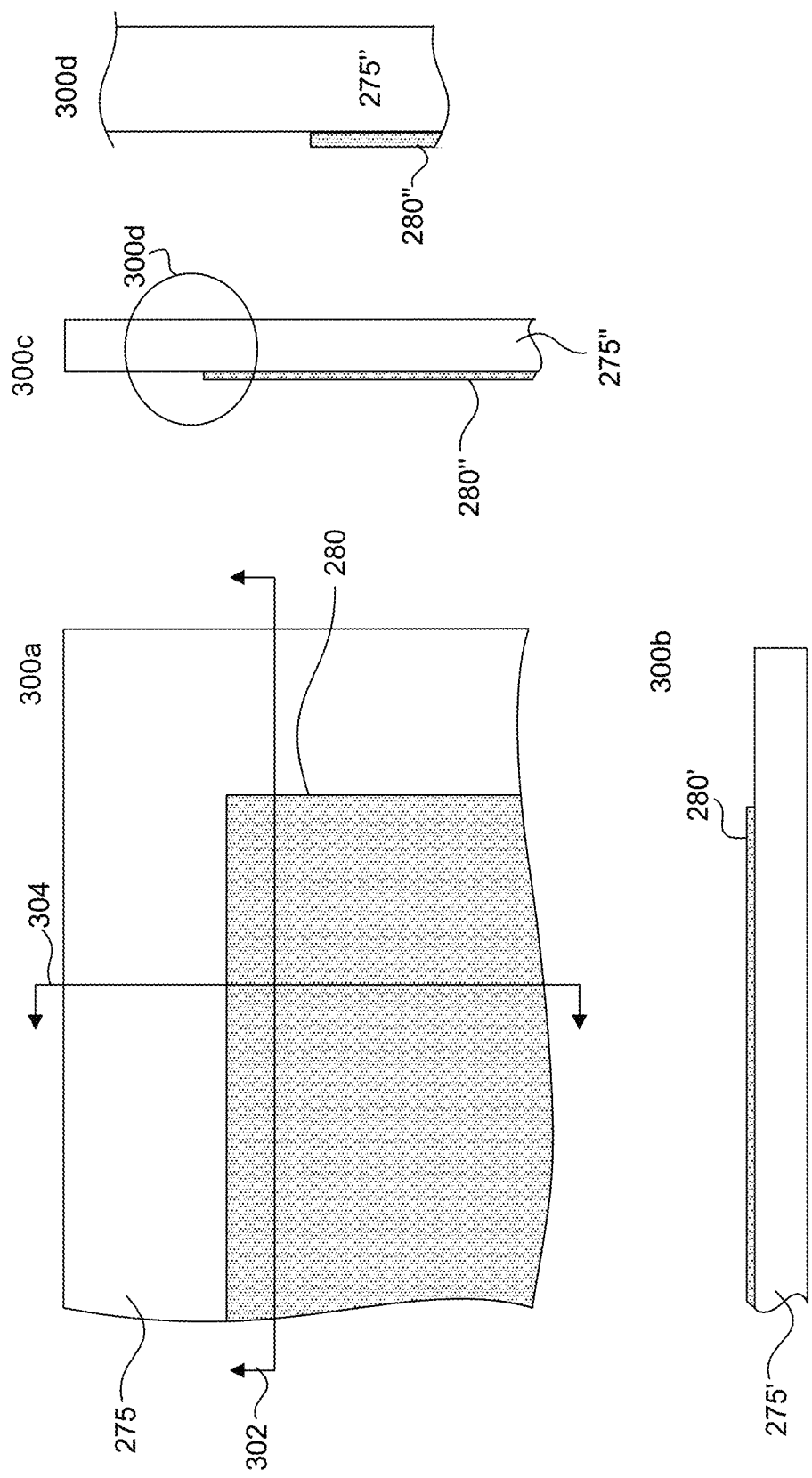
FIG. 3A illustrates an example of a cover glass with a transparent electrode layer, according to an exemplary embodiment of the disclosure.

FIG. 3A illustrates an example 300 of a cover glass 275 with transparent conductor 280, according to an exemplary embodiment of the disclosure. For explanation purposes, FIG. 3A may be described with elements from previous figures. Example 300a is a planar view of portion 150 of PCAP touchscreen 105, example 300b is a cross-section view of planar view 300a taken at 302, example 300c is a cross-section view of planar view 300a taken at 304, and example 300d is a magnified view of cross-section view 300c. To fabricate narrow border 130 of PCAP touchscreen 105, some embodiments include disposing on a first layer, a first transparent electrode. In planar view 300a, transparent conductor 280 may be disposed on cover glass 275. Cross-section view 300b taken at 302 illustrates cross-section transparent conductor 280' disposed on cross-section cover glass 275'. Cross-section view 300c taken at 304 illustrates cross-section transparent conductor 280" on cross-section cover glass 275", and cross-section view 300d illustrates a magnified view of cross-section view 300c.

Figure 3B:
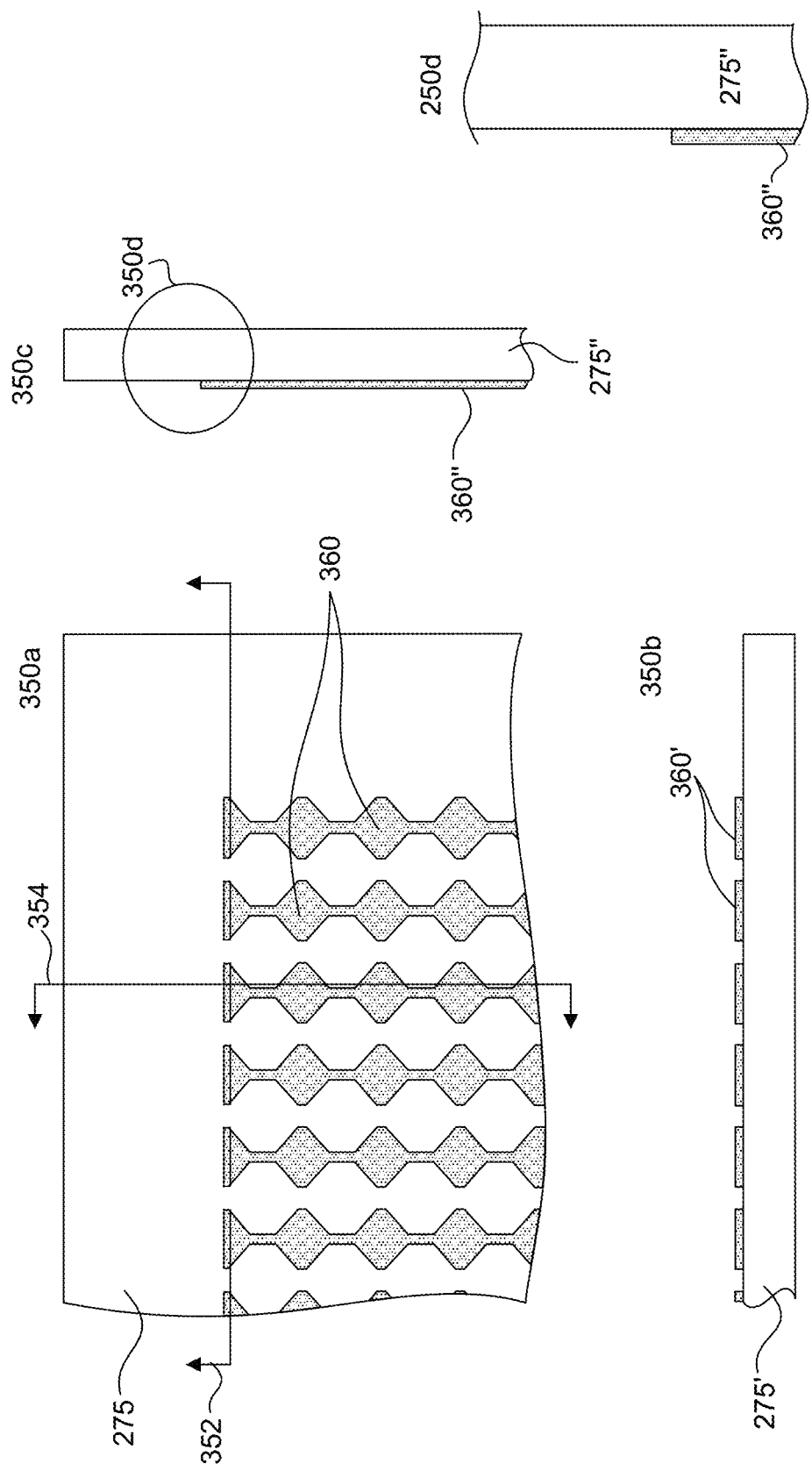
FIG. 3B illustrates an example of a cover glass with a vertical electrode, according to an exemplary embodiment of the disclosure.

FIG. 3B illustrates an example 350 of a cover glass 275 with vertical electrodes 360, according to an exemplary embodiment of the disclosure. For explanation purposes, FIG. 3B may be described with elements from previous figures. Example 350a is a planar view of portion 150 of PCAP touchscreen 105, example 350b is a cross-section view of planar view 350a taken at 352, example 350c is a cross-section view of planar view 350a taken at 354, and example 350d is a magnified view of cross-section view 350c. In some embodiments, a first transparent electrode comprises a vertical electrode. For example, portions of transparent conductor 280 may be removed to generate parallel electrodes such as vertical or horizontal electrodes. In planar view 350a, vertical electrodes 360 are created. While 6 and one half vertical electrodes 360 are shown, only 2 are labeled to simplify the drawings. Each end of a vertical electrode 360 is called an electrode terminus. Cross-section view 350b taken at 352 illustrates cross-section vertical electrodes 360' disposed on cross-section cover glass 275'. Cross-section view 350c taken at 354 illustrates cross-section transparent conductor 360" on cross-section cover glass 275", and cross-section view 350d illustrates a magnified view of cross-section view 350c.

Figure 4A:
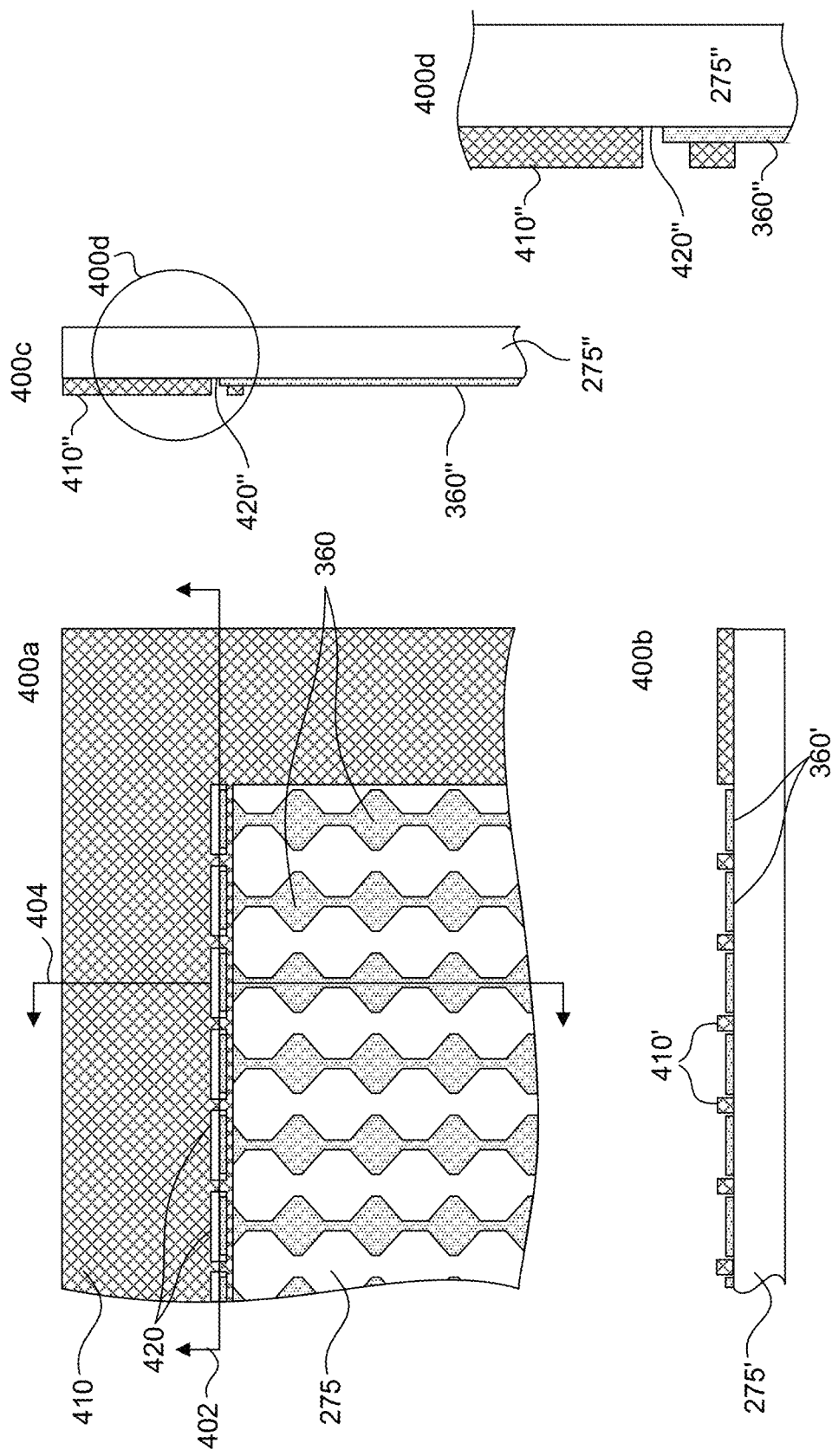
FIG. 4A illustrates an example of an insulating black mask (BM) printed on the cover glass and around an electrode terminus of a vertical electrode, according to an exemplary embodiment of the disclosure.

FIG. 4A illustrates example 400 of insulating black mask (BM) layer 410 printed on cover glass 275 and an opening 420, around each electrode terminus of a vertical electrode 360, according to an exemplary embodiment of the disclosure. For explanation purposes, FIG. 4A may be described with elements from previous figures. Example 400a is a planar view of portion 150 of PCAP touchscreen 105, example 400b is a cross-section view of planar view 400a taken at 402, example 400c is a cross-section view of planar view 400a taken at 404, and example 400d is a magnified view of cross-section view 400c. To fabricate narrow border 130 of PCAP touchscreen 105, some embodiments include printing a first insulating BM layer on the first layer, wherein the first insulating BM layer includes a first opening above an electrode terminus of the vertical electrode. In planar view 400a, first insulating BM layer 410 may be printed on cover glass 275 that marks narrow border 130 on touchscreen 105. First insulating BM layer 410 may cover a part of vertical electrodes 360 but include an opening 420 over each electrode terminus. In this example, 6 and one half openings 420 are shown, but only 2 are labeled to simplify the drawings. Cross-section view 400b taken at 402 illustrates cross-section vertical electrodes 360' disposed on cross-section cover glass 275'. In addition, cross-section first insulating BM layer 410' is shown at the ends of and between cross-section vertical electrodes 360'. Cross-section view 400c taken at 404 illustrates cross-section transparent conductor 360" on cross-section cover glass 275" with the addition of cross-section first insulation BM layer 410". Note that cross-section opening 420" is an area where cross section cover glass 275" is exposed. Cross-section view 400d illustrates a magnified view of cross-section view 400c.

Figure 4B:
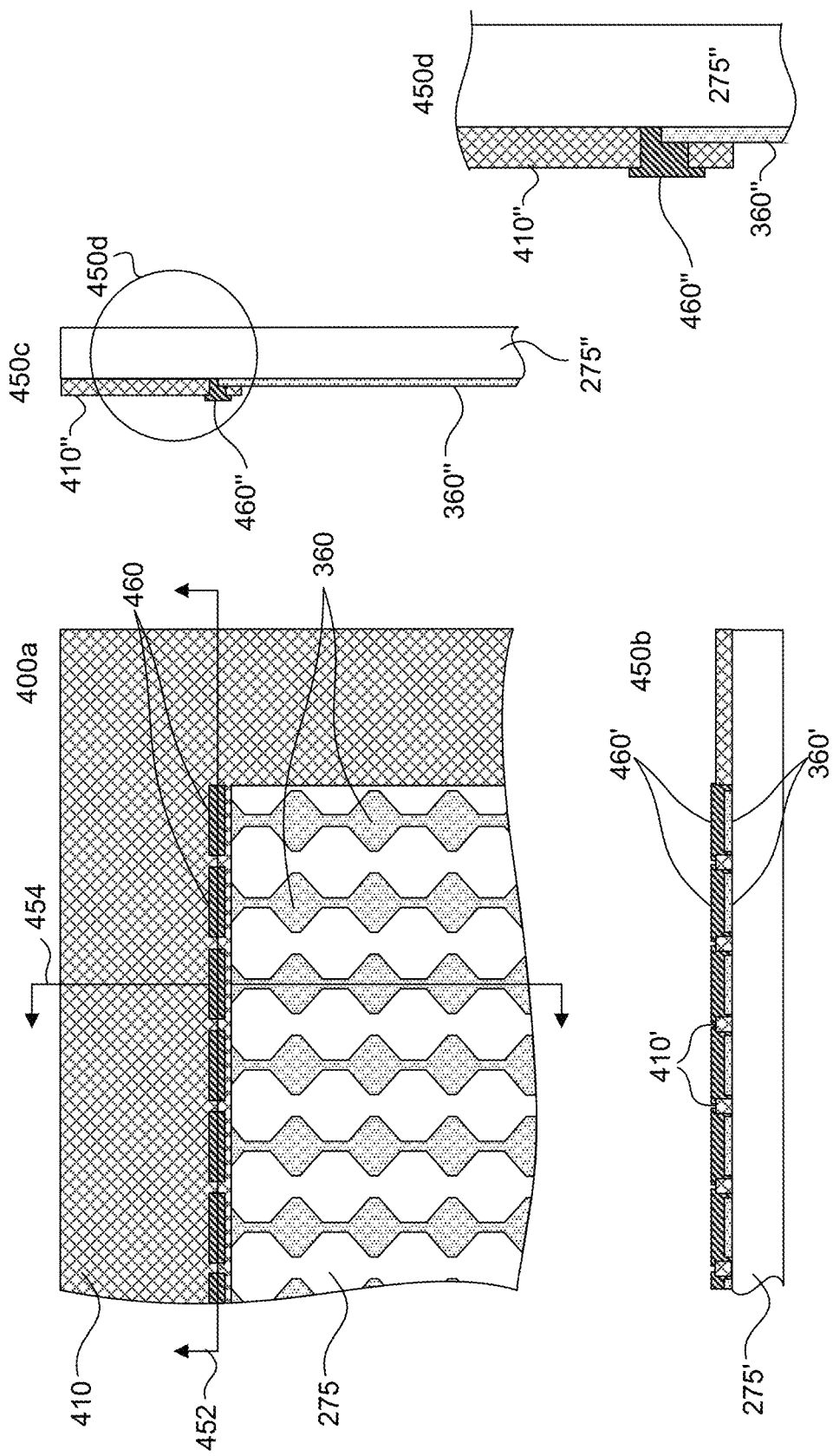
FIG. 4B illustrates an example of a conductive black via (BV) printed on an electrode terminus of a vertical electrode, according to an exemplary embodiment of the disclosure.

FIG. 4B illustrates an example 450 of conductive black via (BV) 460 printed on an electrode terminus of a vertical electrode 360, according to an exemplary embodiment of the disclosure. For explanation purposes, FIG. 4B may be described with elements from previous figures. Example 450a is a planar view of portion 150 of PCAP touchscreen 105, example 450b is a cross-section view of planar view 450a taken at 452, example 450c is a cross-section view of planar view 450a taken at 454, and example 450d is a magnified view of cross-section view 450c. To fabricate narrow border 130 of PCAP touchscreen 105, some embodiments include printing a portion of a conductive BV in the first opening, wherein the portion of the conductive BV is coupled to the electrode terminus. In planar view 450a, a portion of conductive BV 460 may be printed in each opening 420, and the portion of conductive BV 460 may be coupled to an electrode terminus of a vertical electrode 360 and first insulation BM layer 410.

Cross-section view 450b taken at 452 illustrates cross-section vertical electrodes 360' disposed on cross-section cover glass 275'. Openings 420 are filled and cross-sections conductive BV 460' are shown on top of cross-section vertical electrodes 360'; cross-section first insulating BM layer 410' is shown at the ends of and between cross-section vertical electrodes 360' and cross-sections of conductive BV 460'. Cross-section view 450c taken at 454 illustrates cross-section transparent conductor 360" on cross-section cover glass 275" with the addition of cross-section first insulation BM layer 410". Note that cross-section opening 420" has been filled with cross-section of conductive BV 460". Cross-section view 400d illustrates a magnified view of cross-section view 400c.

Figure 5A:
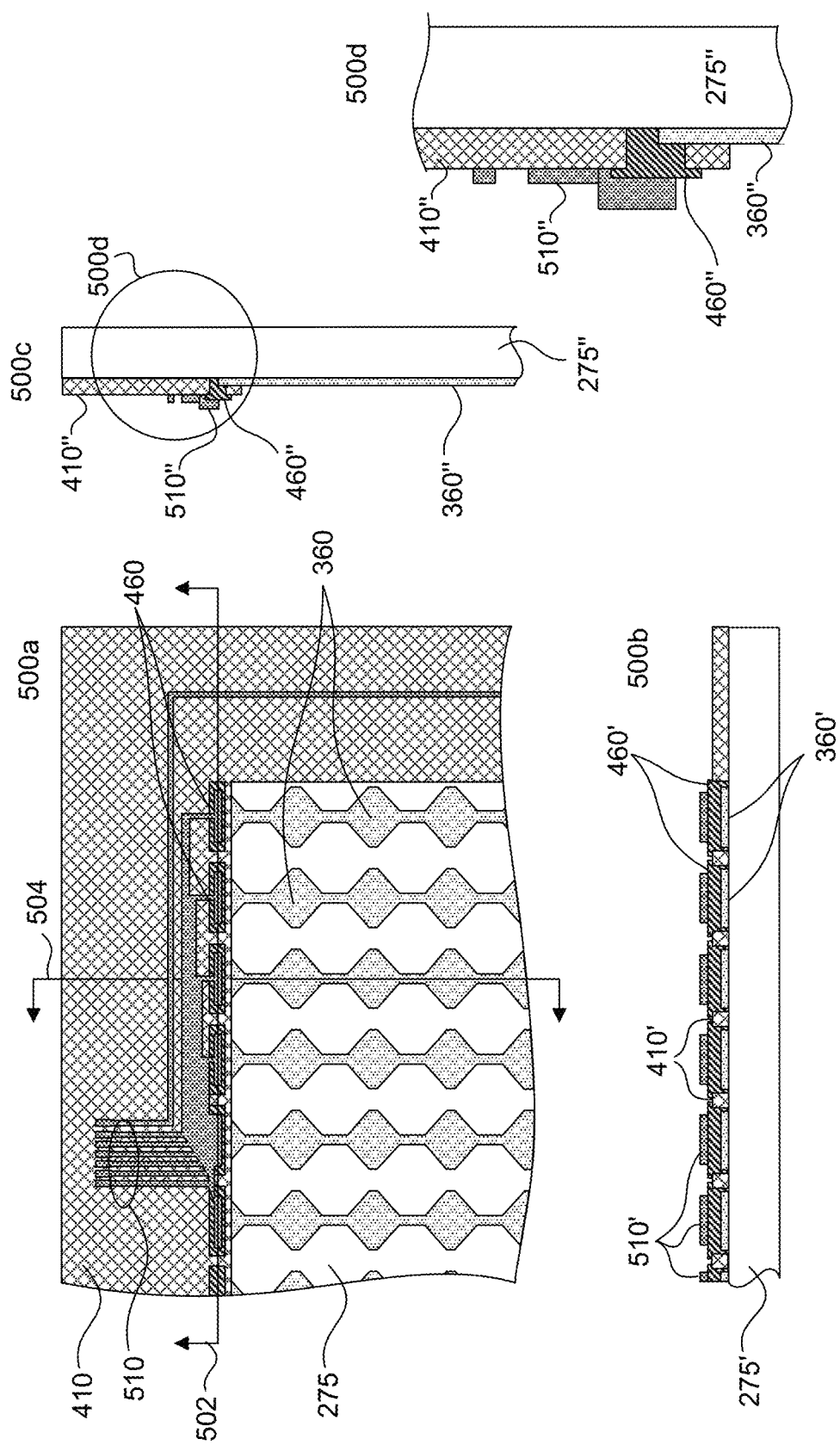
FIG. 5A illustrates an example of a silver paste printed on a portion of a conductive BV and on the insulating BM printed on the cover glass, according to an exemplary embodiment of the disclosure.

FIG. 5A illustrates example 500 of silver paste 510 printed on portions of conductive BV 460 and on first insulating BM layer 410 printed on cover glass 275, according to an exemplary embodiment of the disclosure. For explanation purposes, FIG. 5A may be described with elements from previous figures. Example 500a is a planar view of portion 150 of PCAP touchscreen 105, example 500b is a cross-section view of planar view 500a taken at 502, example 500c is a cross-section view of planar view 500a taken at 504, and example 500d is a magnified view of cross-section view 500c. To fabricate narrow border 130 of PCAP touchscreen 105, some embodiments include printing silver paste on the portion of the conductive BV and on the first insulating BM layer where transmitter or receiver silver traces are desired. For example, silver paste 510 may be printed on portions of conductive BV 460 as well as on areas of first insulating BM layer 410 where transmitter, receiver, and/or ground silver traces are desired. Although the oval label for silver paste 510 includes a narrow portion of silver paste 510, note that silver paste 510 also includes the unconventional pattern below including portions on conductive BV 460.

Cross-section view 500b taken at 502 illustrates cross-section vertical electrodes 360' disposed on cross-section cover glass 275'. Cross sections of silver paste 510' are illustrated as printed on cross-sections of portions of conductive BVs 460' that are shown on cross-section vertical electrodes 360'. Cross-section first insulating BM layer 410' is shown at the ends of and between cross-section vertical electrodes 360' and cross-sections of conductive BV 460', and below some cross-sections of silver paste 510'. Cross-section view 500c taken at 504 illustrates cross-section transparent conductor 360" on cross-section cover glass 275", cross-section first insulation BM layer 410", and cross-section of conductive BV 460". Cross-section silver paste 510" is added on top of cross-section conductive BV 460" and cross-section first insulation BM layer 410". Cross-section view 500d illustrates a magnified view of cross-section view 500c.

Figure 5B:
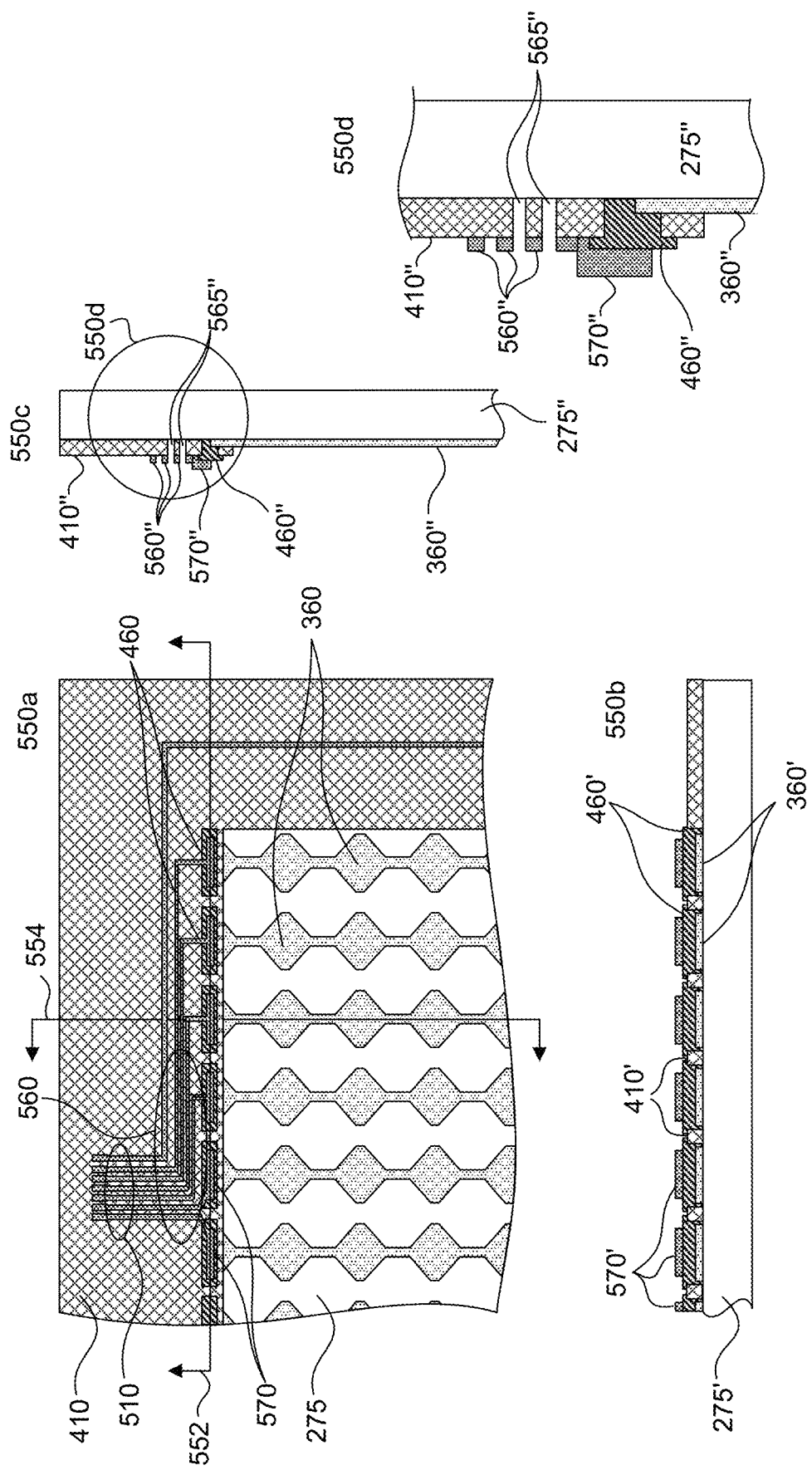
FIG. 5B illustrates an example of an ablation of excess silver paste, according to an exemplary embodiment of the disclosure.

FIG. 5B illustrates example 550 of an ablation of silver paste 510 excess, according to an exemplary embodiment of the disclosure. For explanation purposes, FIG. 5B may be described with elements from previous figures. Example 550a is a planar view of portion 150 of PCAP touchscreen 105, example 550b is a cross-section view of planar view 550a taken at 552, example 550c is a cross-section view of planar view 550a taken at 554, and example 550d is a magnified view of cross-section view 550c. To fabricate narrow border 130 of PCAP touchscreen 105, some embodiments include using a laser (not shown) to ablate excess silver paste that includes leaving a deposit of the silver paste within a boundary of the portion of the conductive BV where the deposit is coupled to the first silver trace, and defining remaining silver traces of the first set of silver traces. For example, a laser may be used to remove excess silver paste 510 on first insulating BM layer 410 to define first set of silver traces 560. First set of silver traces 560 may be equivalent to first set of silver traces 154 of FIG. 1C. In addition, a laser may be used to remove excess silver paste 510 to leave a silver paste deposit 570 on portions of conductive BV 460. Silver paste deposits 570 are coupled to first set of silver traces 560. Although 6 and one half silver paste deposits 570 are shown, only three are labeled to simplify the drawing.

Cross-section view 550b taken at 552 illustrates cross-section vertical electrodes 360' disposed on cross-section cover glass 275'. In some embodiments, laser ablations may remove excess of silver paste 510' as shown in cross-section view 500b of FIG. 5A, to form cross-sections of silver paste deposits 570' in cross-section view 550b of FIG. 5B. Cross-sections of silver paste deposits 570' are illustrated on cross-sections of portions of conductive BVs 460' on cross-section vertical electrodes 360'. Cross-section first insulating BM layer 410' is shown at the ends of and between cross-section vertical electrodes 360' and cross-sections of conductive BV 460'.

Cross-section views 550c and 550d taken at 554 illustrate the following on cross-section cover glass 275": cross-section transparent conductor 360"; cross-section first insulation BM layer 410"; and cross-section conductive BV 460". Laser ablations of cross-section silver paste 510" create a) cross-sections of first set of silver traces 560" on cross-section first insulation BM layer 410"; and b) cross-sections of silver paste deposits 570" on top of cross-section conductive BV 460" and cross section first insulation BM layer 410".

Cross-section view 550d further illustrates that the laser ablation may remove not only the excess silver paste to create cross-sections of silver paste deposits 570", but the laser ablation may also remove parts of first insulating BM layer down to the cover glass 275". Thus, patterns left due to the laser ablation could be visible within narrow border 130 of FIG. 1A. For example, the laser ablations may remove excess cross-section silver paste 510" down to cover glass 275" in creating cross-section first set of silver traces 560", and the exposed portions of cover glass 275" are labeled as gaps 565". Although two gaps 565" are shown and labeled to simplify the drawing, there may be other gaps 565" present that are not represented in the drawing.

Figure 6:
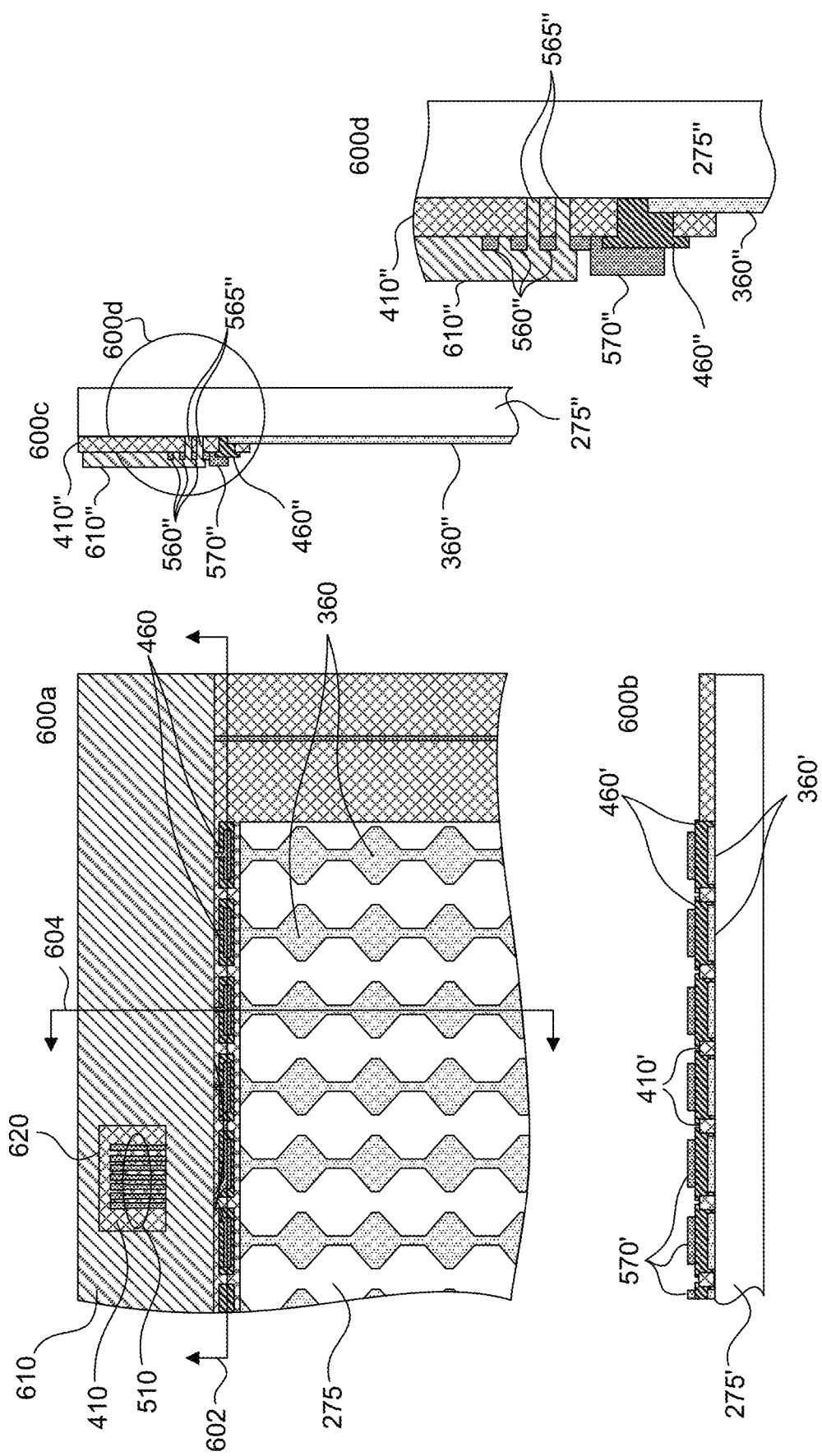
FIG. 6 illustrates an example of another insulating BM printed to fill gaps through to the cover glass, according to an exemplary embodiment of the disclosure.

FIG. 6 illustrates example 600 of another insulating BM layer 610 printed to fill gaps 565" through to cover glass 275", according to an exemplary embodiment of the disclosure. For explanation purposes, FIG. 6 may be described with elements from previous figures. Example 600*a* is a planar view of portion 150 of PCAP touchscreen 105, example 600*b* is a cross-section view of planar view 600*a* taken at 602, example 600*c* is a cross-section view of planar view 600*a* taken at 604, and example 600*d* is a magnified view of cross-section view 600*c*. To fabricate narrow border 130 of PCAP touchscreen 105, some embodiments include creating a gap through the silver paste and the first insulating BM layer to the first layer, and printing a second insulating BM layer that fills the gap. Further, printing the second insulating BM layer may include printing the second insulating BM layer that covers the first set of silver traces except a second opening that exposes leads of the first set of silver traces to be coupled with a connector. For example, a second insulating BM layer 610 may be printed to: a) cover first set of silver traces 560 (e.g., first set of silver traces 560"); b) cover a portion of first insulating BM layer 410 (e.g., shown as 410") except at opening 620 where a connector may be coupled to leads of silver paste 510 (e.g., a connector to a flex cable that couples touchscreen 105 to display device 110 as shown on FIG. 1A); and c) fill gaps 565" that were created by the laser ablation as shown in cross-section views 600*c* and 600*d*.

Cross-section view 600*b* taken at 602 illustrates cross-section vertical electrodes 360' disposed on cross-section cover glass 275'. Cross-section first insulating BM layer 410' is shown at the ends of and between cross-section vertical electrodes 360' and cross-sections of conductive BV 460'. Cross-sections of silver paste deposits 570' are illustrated on cross-sections of portions of conductive BVs 460' that are shown on cross-section vertical electrodes 360'.

Cross-section view 600*d* illustrates that cross-section second insulating BM layer 610" covers cross-sections of first insulating BM layer 410", cross-sections of silver paste deposits 570", cross-sections of first set of silver traces 560", and fills in gaps 565".

FIG. 7A illustrates example 700 of sensor glass 290 with transparent conductor 285, according to an exemplary embodiment of the disclosure. For explanation purposes, FIG. 7A may be described with elements from previous figures. Example 700*a* is a planar view of portion 150 of PCAP touchscreen 105, example 700*b* is a cross-section view of planar view 700*a* taken at 702, example 700*c* is a cross-section view of planar view 700*a* taken at 704. To fabricate narrow border 130 of PCAP touchscreen 105, some embodiments include disposing on a second layer, a second transparent electrode parallel to the first transparent electrode. For example, transparent conductor 285 may be disposed on sensor glass 290. Cross-section view 700*b* taken at 702 illustrates cross-section transparent conductor 285' disposed on cross-section sensor glass 290'. Cross-section view 700*c* taken at 704 illustrates cross-section transparent conductor 285" on cross-section sensor glass 290".

Figure 7B:
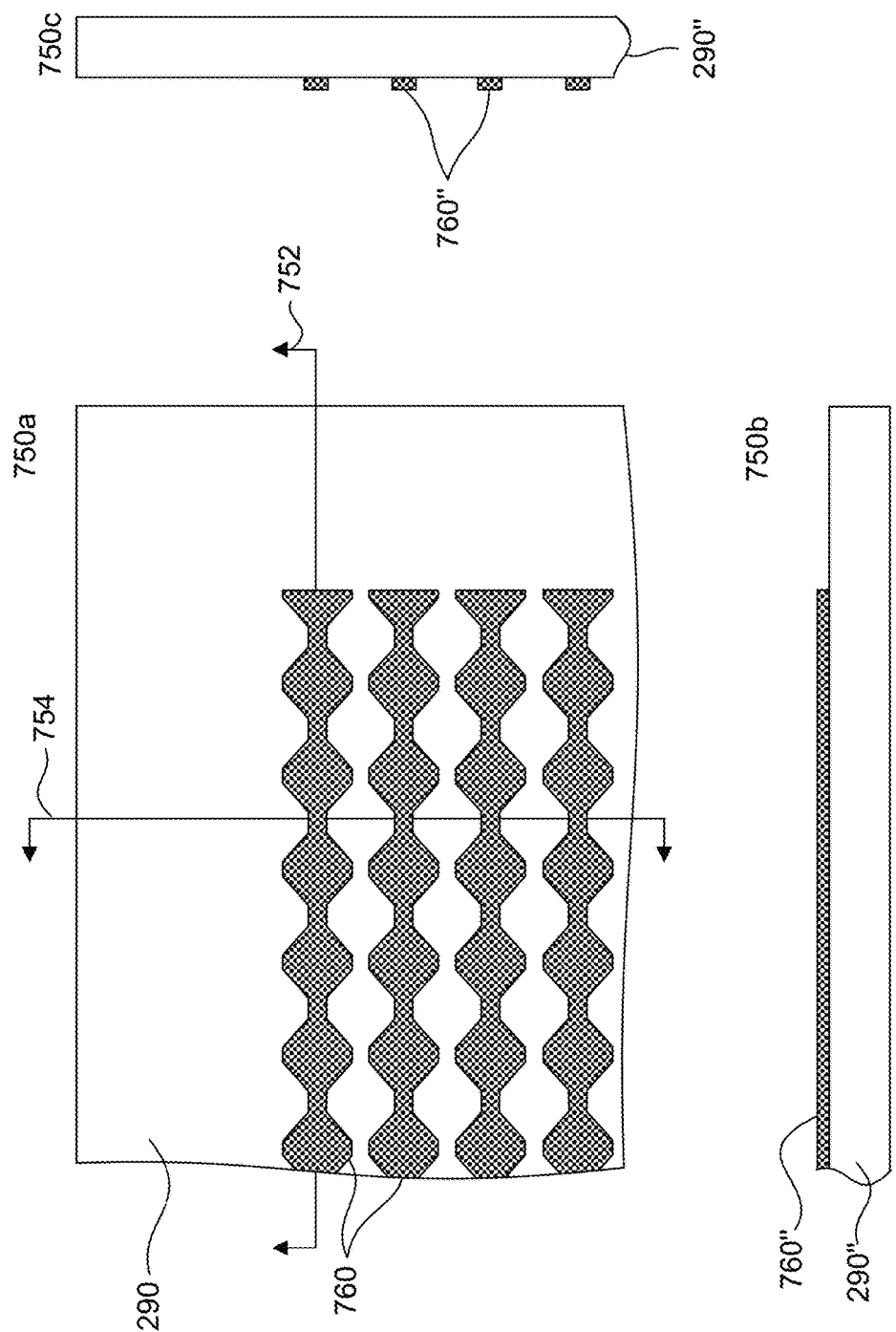
FIG. 7B illustrates an example of a sensor glass with a horizontal electrode, according to an exemplary embodiment of the disclosure.

FIG. 7B illustrates example 750 of sensor glass 290 with horizontal electrode 760, according to an exemplary embodiment of the disclosure. For explanation purposes, FIG. 7B may be described with elements from previous figures. In some embodiments, a second transparent electrode comprises a horizontal electrode. For example, portions of transparent conductor 285 may be removed to generate parallel electrodes such as vertical or horizontal electrodes. In this example, horizontal electrodes 760 are created. While 4 horizontal electrodes 760 are shown, only 2 are labeled to simplify the drawings. Each end of a horizontal electrode 760 is called an electrode terminus. Example 750*a* is a planar view of portion 150 of PCAP touchscreen 105, example 750*b* is a cross-section view of planar view 750*a* taken at 752, example 750*c* is a cross-section view of planar view 750*a* taken at 754. Cross-section view 750*b* taken at 752 illustrates cross-section horizontal electrodes 760' disposed on cross-section sensor glass 290'. Cross-section view 750*c* taken at 754 illustrates cross-section horizontal electrodes 760" disposed on cross-section sensor glass 290".

Figure 8A:
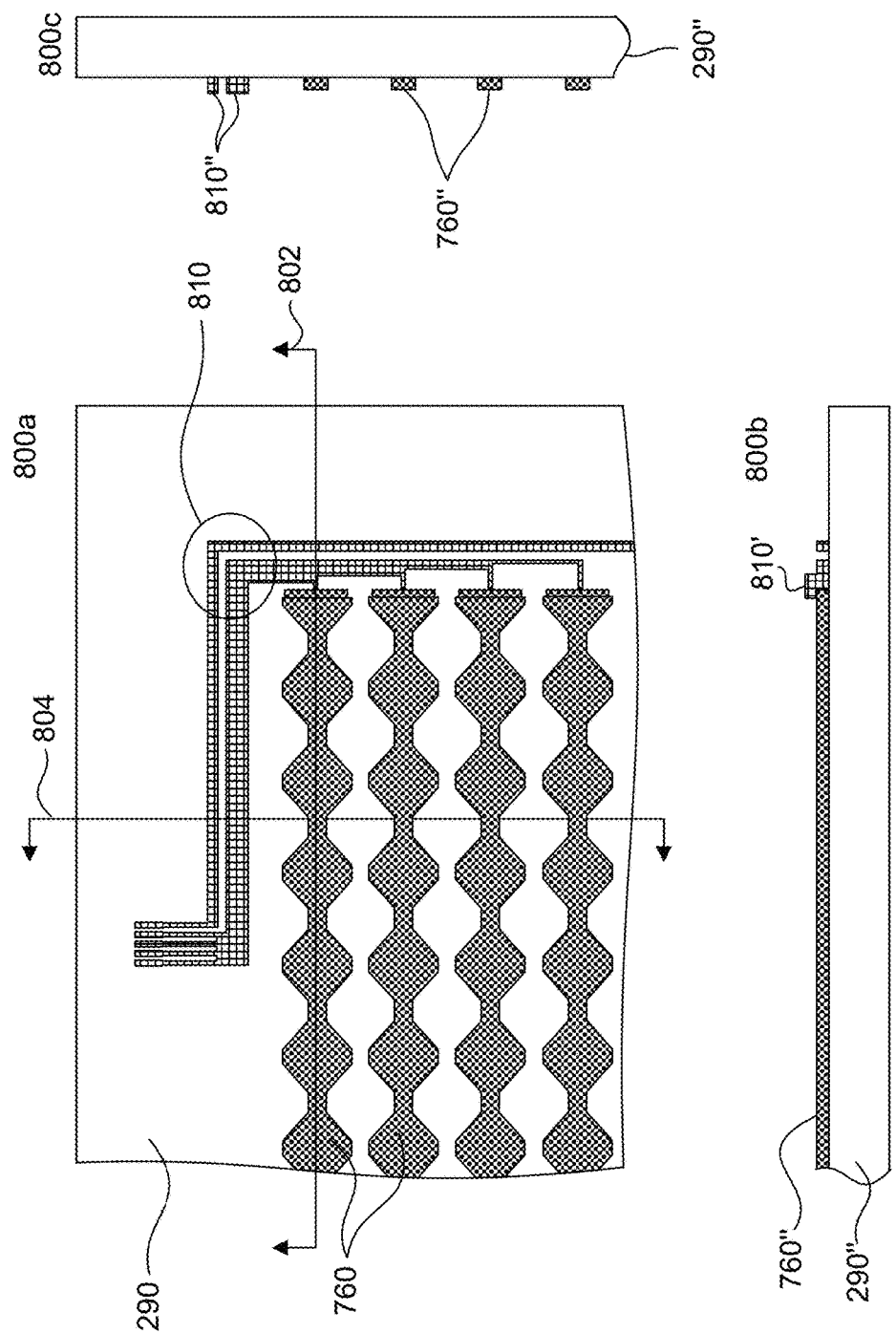
FIG. 8A illustrates an example of silver paste printed on a portion of the sensor glass, according to an exemplary embodiment of the disclosure.

FIG. 8A illustrates example 800 of silver paste 810 printed on a portion of sensor glass 290, according to an exemplary embodiment of the disclosure. For explanation purposes, FIG. 8A may be described with elements from previous figures. Example 800*a* is a planar view of portion 150 of PCAP touchscreen 105, example 800*b* is a cross-section view of planar view 800*a* taken at 802, example 800*c* is a cross-section view of planar view 800*a* taken at 804. To fabricate narrow border 130 of PCAP touchscreen 105, some embodiments include printing silver paste on the second layer where transmitter or receiver silver traces are desired, where the silver paste is coupled to a second transparent electrode. For example, silver paste 810 may be printed on portions of sensor glass 290 where transmitter, receiver, and/or ground silver traces are desired, and silver paste 810 may be coupled to horizontal electrodes 760. Although the oval label of silver paste 810 encircles only a part of silver paste 810, note that silver paste 810 also includes the areas with the same pattern. Cross-section view 800*b* taken at 802 illustrates cross-section horizontal electrodes 760' disposed on cross-section sensor glass 290'. Cross sections of silver paste 810' are illustrated as printed on cross-sections of portions of cross-section horizontal electrodes 760' and sensor glass 290'. Cross-section view 800*c* taken at 804 illustrates cross-section horizontal electrodes 760" disposed on cross-section sensor glass 290". Cross sections of silver paste 810" are illustrated as printed on sensor glass 290".

Figure 8B:
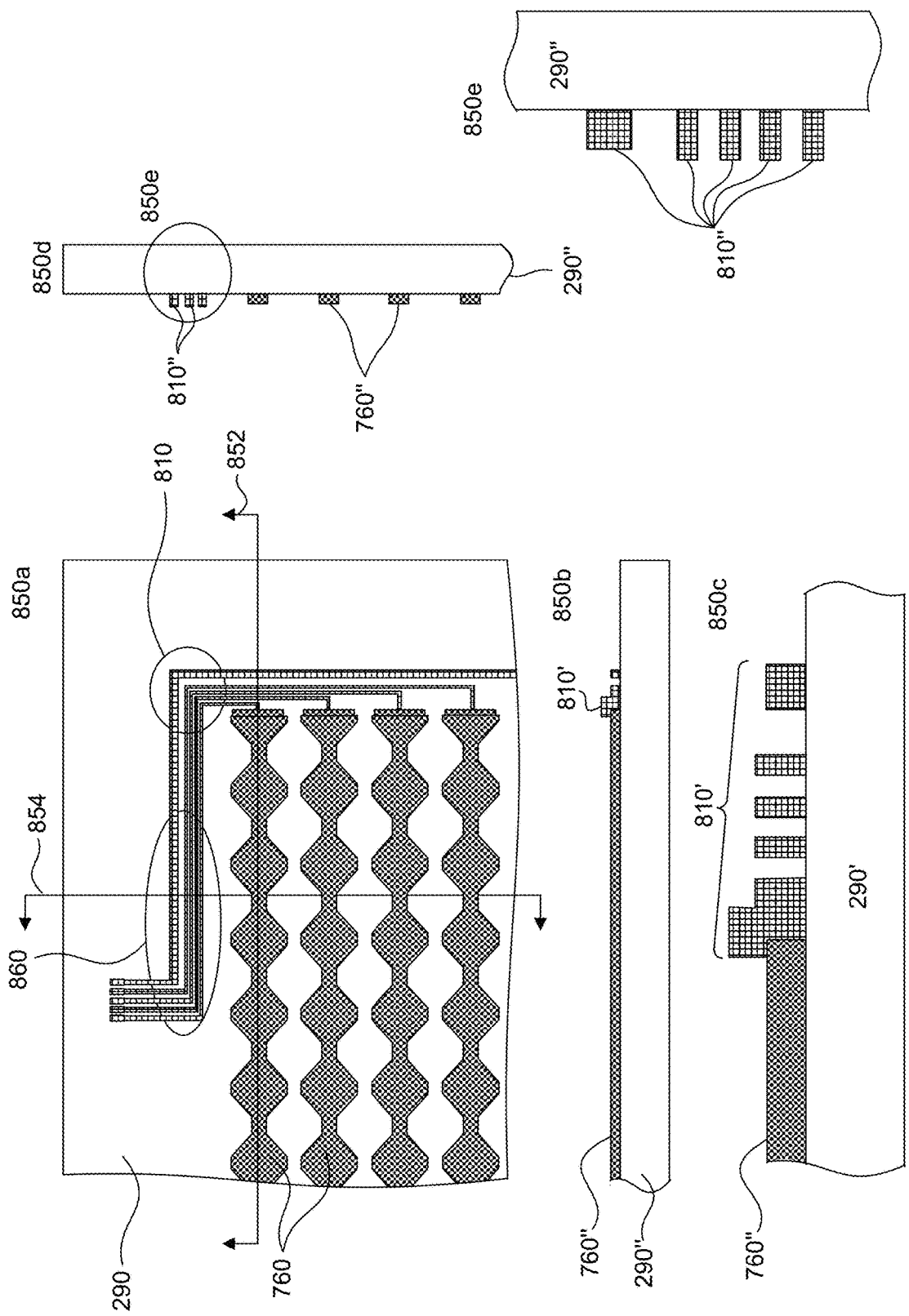
FIG. 8B illustrates an example of an ablation of excess silver paste, according to an exemplary embodiment of the disclosure.

FIG. 8B illustrates example 850 of excess silver paste 810 ablation, according to an exemplary embodiment of the disclosure. For explanation purposes, FIG. 8B may be described with elements from previous figures. Example 850*a* is a planar view of portion 150 of PCAP touchscreen 105, example 850*b* is a cross-section view of planar view 850*a* taken at 852, and cross-section view 850*c* is a magnification of cross-section view 850*b*. Example 850*d* is a cross-section view of planar view 850*a* taken at 854, and cross-section view 850*e* is a magnified view of cross-section view 850*d*. To fabricate narrow border 130 of PCAP touchscreen 105, some embodiments include using a laser (not shown) to ablate excess silver paste. For example, a laser may be used to remove some parts of silver paste 810 on sensor glass 290 to define a second set of silver traces 860 (e.g., the laser ablation may remove parts of silver paste 810 that are not needed so that second set of silver traces 860 remains.) In an example, second set of silver traces 860 may be equivalent to second set of silver traces 156 of FIG. 1C. Cross-section view 850*b* taken at 852 illustrates cross-section horizontal electrodes 760' disposed on cross-section sensor glass 290'. Cross-sections of silver paste 810' are illustrated on cross-sections of portions of cross-section horizontal electrodes 760' and sensor glass 290'. Cross-section view 800*c* is a magnified view of cross-section view 850*b* where the spaces between cross-sections of silver paste 810' are visible.

Cross-section view 850*d* taken at 854 illustrate cross-section horizontal electrodes 760" disposed on cross-section sensor glass 290" and cross-sections of silver paste 810" are illustrated as printed on cross-section sensor glass 290". Cross-section view 850*e* illustrates a magnification of cross-sections of silver paste 810" on cross-section sensor glass 290" including spaces where cross-sections of silver paste 810" are not printed on cross-section sensor glass 290".

Figure 9A:
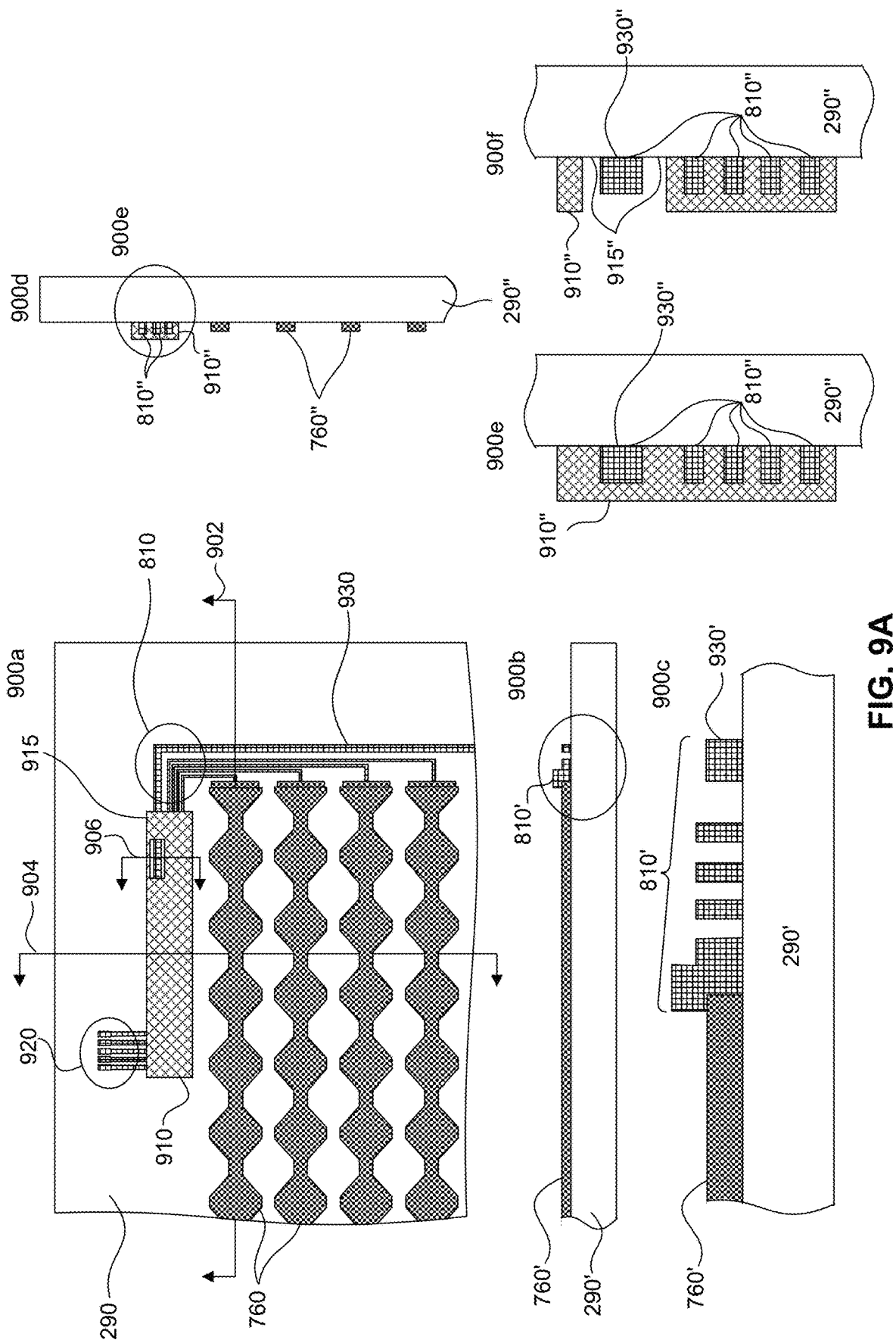
FIG. 9A illustrates an example of an insulation layer printed to cover silver traces on the sensor glass, according to an exemplary embodiment of the disclosure.

FIG. 9A illustrates example 900 of insulation layer 910 printed to cover second set of silver traces 860 on the sensor glass, according to an exemplary embodiment of the disclosure. For explanation purposes, FIG. 9A may be described with elements from previous figures. Example 900*a* is a planar view of portion 150 of PCAP touchscreen 105, example 900*b* is a cross-section view of planar view 900*a* taken at 902, and cross-section view 900*c* is a magnification of cross-section view 900*b*. Example 900*d* is a cross-section view of planar view 900*a* taken at 904, and cross-section view 900*e* is a magnified view of cross-section view 900*d*. Example 900*f* is a cross-section view of planar view 900*a* taken at 906 across insulation layer 910 and opening 915.

To fabricate narrow border 130 of PCAP touchscreen 105, some embodiments include printing an insulation layer to substantially overlap the second set of silver traces within the narrow border of the PCAP touchscreen. In some embodiments, printing the silver paste on the second layer includes printing a ground silver trace, and printing the insulation layer includes printing the insulation around a second opening that exposes the ground silver trace. For example, insulation layer 910 may be printed to substantially cover second set of silver traces 860. Portions of second set of silver traces 860 may remain uncovered such as silver trace leads 920 and silver paste 810. Further, insulation layer 910 may include an opening 915 through which a ground silver trace 930 is left exposed (e.g., not covered by insulation layer 910.)

Cross-section view 900*b* taken at 902 illustrates cross-section horizontal electrodes 760' disposed on cross-section sensor glass 290'. Cross-sections of silver paste 810' are illustrated on cross-sections of portions of cross-section horizontal electrodes 760' and sensor glass 290'. Cross-section view 900*c* is a magnification of portions of 900*b* and illustrates spaces between cross-sections of silver paste 810'. Note that cross-sections of silver paste 810' includes cross-section ground silver trace 930'.

Cross-section view 900*d* taken at 904 illustrates cross-section insulation layer 910" filling spaces between cross-sections of silver paste 810" on cross-section sensor glass 290" such that the spaces are not visible in narrow border 130 of FIG. 1A, for example. Cross-section view 900*e* is a magnification of cross-sections of silver paste 810" that includes cross-section ground silver trace 930", which is covered by cross-section insulation layer 910".

Cross-section view 900*f* taken at 906 illustrates cross-section opening 915" shown as spaces on cross-section sensor glass 290" adjacent to cross-section ground silver trace 930", where cross-section ground silver trace 930" is not covered by cross-section insulation layer 910". In contrast, remaining cross-sections of silver paste 810" are covered by cross-section insulation layer 910".

Figure 9B:
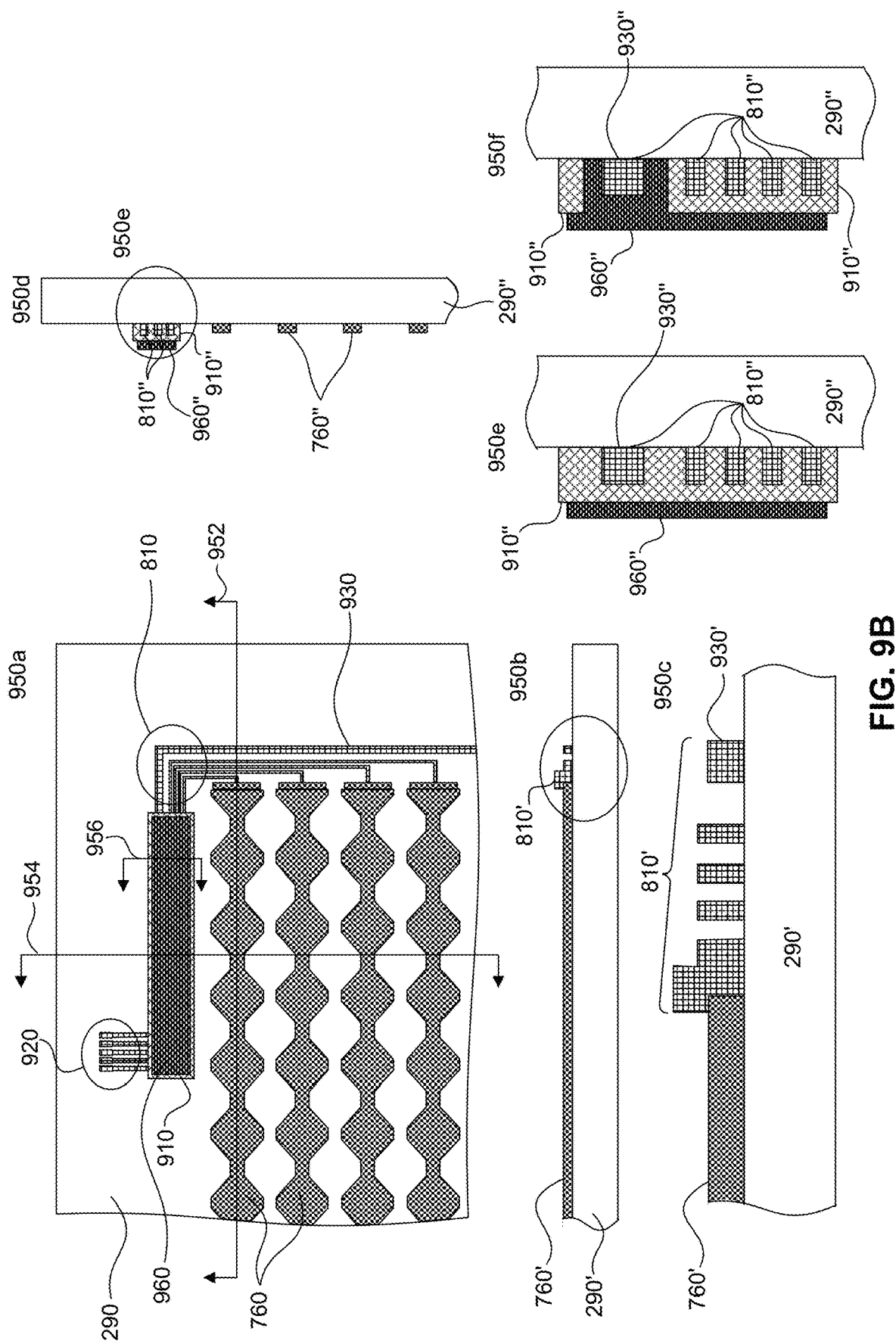
FIG. 9B illustrates an example of a shield layer printed on the insulation layer, according to an exemplary embodiment of the disclosure.

FIG. 9B illustrates example 950 of shield layer 960 printed on insulation layer 910, according to an exemplary embodiment of the disclosure. For explanation purposes, FIG. 9B may be described with elements from previous figures. Example 950*a* is a planar view of portion 150 of PCAP touchscreen 105, example 950*b* is a cross-section view of planar view 950*a* taken at 952, and cross-section view 950*c* is a magnification of cross-section view 950*b*. Example 950*d* is a cross-section view of planar view 950*a* taken at 954, and cross-section view 950*e* is a magnified view of cross-section view 950*d*. Example 950*f* is a cross-section view of planar view 950*a* taken at 956 across insulation layer 910 and opening 915.

To fabricate narrow border 130 of PCAP touchscreen 105, some embodiments include printing a shield layer on the insulation layer, where the second opening in the insulation layer leaves the ground silver trace exposed to the shield layer. For example, shield layer 960 may be printed to substantially cover insulation layer 910. Further, shield layer 960 may be coupled with ground silver trace 930 due to opening 915 in insulation layer 910. Shield layer 960 may be equivalent to shield layer 160 of FIG. 1C, for example.

Cross-section view 950*b* taken at 952 illustrates cross-section horizontal electrodes 760' disposed on cross-section sensor glass 290'. Cross-sections of silver paste 810' are illustrated on cross-sections of portions of cross-section horizontal electrodes 760' and sensor glass 290'. Cross-section view 950*c* is a magnification of portions of 950*b* and illustrates spaces between cross-sections of silver paste 810'. Note that cross-sections of silver paste 810' includes cross-section ground silver trace 930'.

Cross-section view 950*d* taken at 954 illustrates cross-section shield layer 960" added to cross-section insulation layer 910" that fills spaces between cross-sections of silver paste 810" on cross-section sensor glass 290" such that the spaces are not visible in narrow border 130 of FIG. 1A. Cross-section view 950*e* is a magnification of cross-sections of silver paste 810" that includes cross-section ground silver trace 930", which are covered by cross-section insulation layer 910". Cross-section shield layer 960" is located on top of cross-section insulation layer 910".

Cross-section view 950*f* taken at 956 illustrates cross-section opening 915" shown as spaces on cross-section sensor glass 290" adjacent to cross-section ground silver trace 930", where cross-section shield layer 960" fills in the space left by cross-section opening 915" as shown in 900*f* of FIG. 9A, around cross-section ground silver trace 930". Thus, cross-section shield layer 960" may be coupled to portions of cross-sections of silver paste 810" such as ground silver trace 930". In contrast, remaining cross-sections of silver paste 810" are coupled to cross-section insulation layer 910". Some portions of cross-section insulation layer 910" that cover remaining cross-sections of silver paste 810" are coupled to cross-section shield layer 960".

Figure 9C:
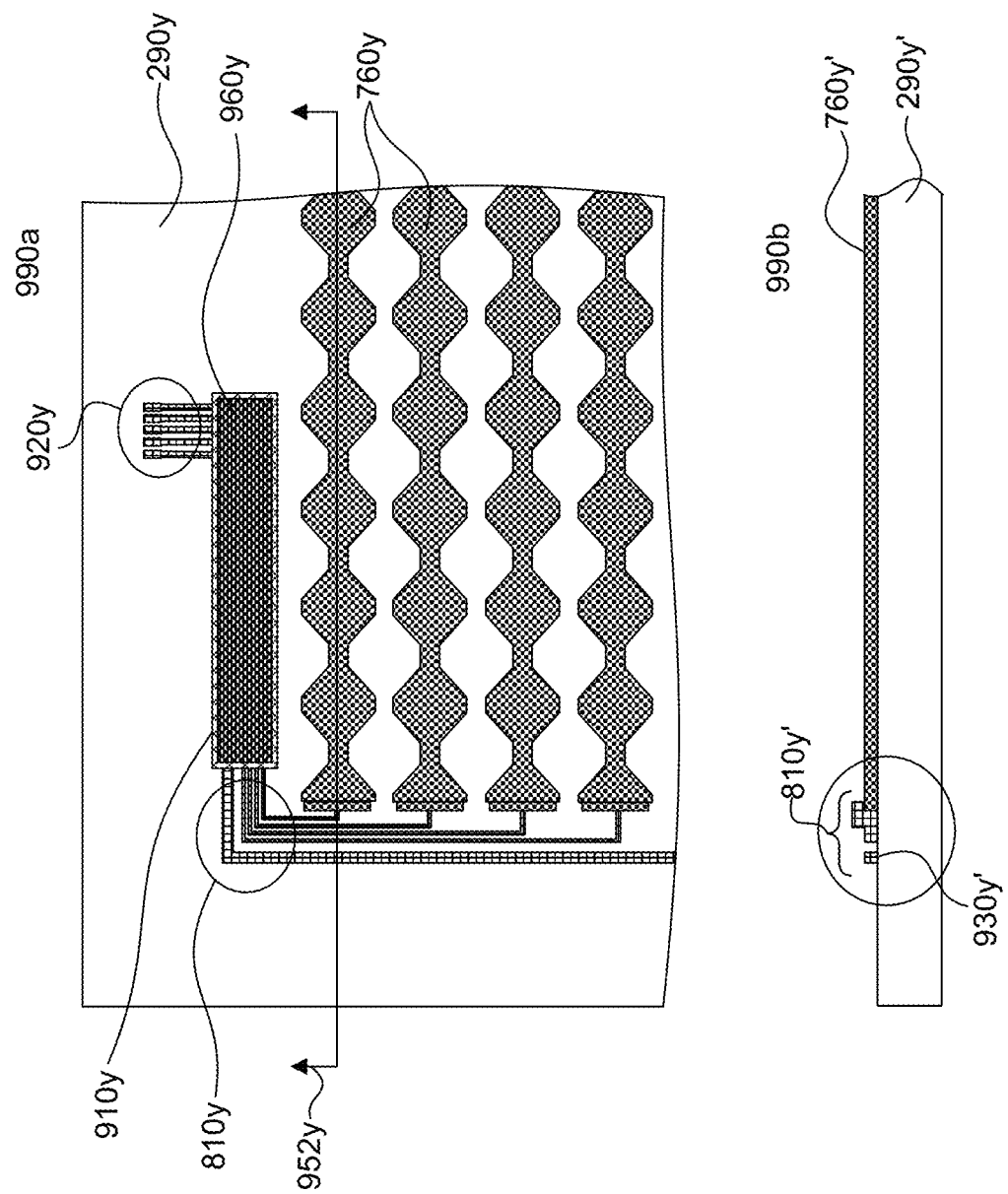
FIG. 9C illustrates an example sensor glass assembly with a shield layer printed on the insulation layer, according to an exemplary embodiment of the disclosure.

FIG. 9C illustrates an example sensor glass assembly 990 with a shield layer 960*y* printed on insulation layer 910*y*, according to an exemplary embodiment of the disclosure. Sensor glass assembly 990 is composed like sensor glass assembly 950, where the orientation of parts like silver paste 810 are located on a different side (e.g., inverted along the y-axis.) Since the composition is the same but with a different orientation, labels of example 990 are identified with the addition of a "y". Thus, planar view 990*a* includes but is not limited to: sensor glass 290*y*, with horizontal electrodes 760*y*, silver paste 810*y*, and insulation layer 910*y* coupled to shield layer 960*y*, where silver trace leads 920*y* may remain uncovered. Planar view 990*a* can be a portion 150 of PCAP touchscreen 105, and example 990*b* is a cross-section view of planar view 990*a* taken at 952*y*.

Cross-section view 990*b* taken at 952*y* illustrates cross-section horizontal electrodes 760*y'* disposed on cross-section sensor glass 290*y'*. Cross-sections of silver paste 810*y'* are illustrated on cross-sections of portions of cross-section horizontal electrodes 760*y'* and sensor glass 290*y'*. Note that cross-sections of silver paste 810*y'* includes cross-section ground silver trace 930*y'*.

Figure 10:
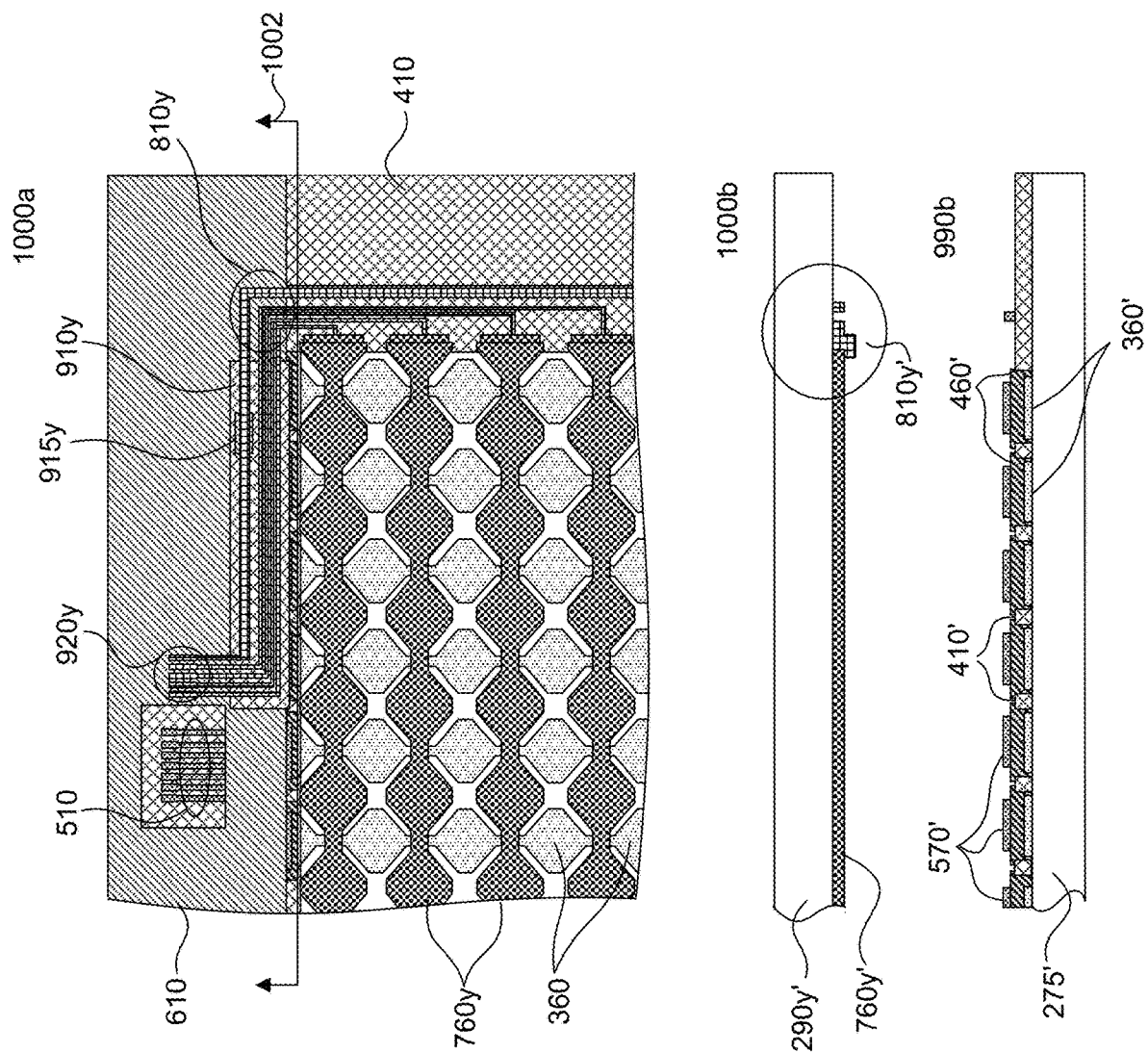
FIG. 10 illustrates an example of a combination of the cover glass assembly and the sensor glass assembly, according to an exemplary embodiment of the disclosure.

FIG. 10 illustrates example 1000 of combination of the cover glass assembly 600 of FIG. 6 and the sensor glass assembly 990 of FIG. 9C, according to an exemplary embodiment of the disclosure. For explanation purposes, FIG. 10 may be described with elements from previous figures. In some embodiments, combination 1000 is equivalent to 150 of FIG. 1C, where shield layer 160 is equivalent to shield layer 960*y* of FIG. 9C, that is not visible in combination 1000.

To fabricate narrow border 130 of PCAP touchscreen 105, some embodiments include assembling the first layer with the second layer, where the first set of silver traces substantially overlaps the second set of silver traces within the narrow border of the PCAP touchscreen, and where the overlapped sets of silver traces are separated by a shield layer. Some embodiments further include applying an adhesive between the first layer and the second layer. For example, cover glass assembly 600 may be assembled with sensor glass assembly 990 with adhesive 283 (of FIG. 2A) between them. In other words, adhesive 283 may be sandwiched between cover glass assembly 600 on the bottom and sensor glass assembly 990 on the top as shown in combination 1000. Vertical electrodes 360 are aligned with horizontal electrodes 760*y* and first set of silver traces 560 (not shown) of cover glass assembly 600 substantially overlap second set of silver traces 860*y* coupled to second insulating BM layer 610, where the overlapped first set of silver traces 560 and second set of silver traces 860*y* are separated by shield layer 960*y* and insulation layer 910*y*. Cross-section view 1000*b* taken at 1002 illustrates a combination of cross-section view 600*b* taken at 602 and cross-section view 990*b* taken at 952*y* with the addition of adhesive 283. Accordingly, those descriptions are not repeated here.

Figure 11:
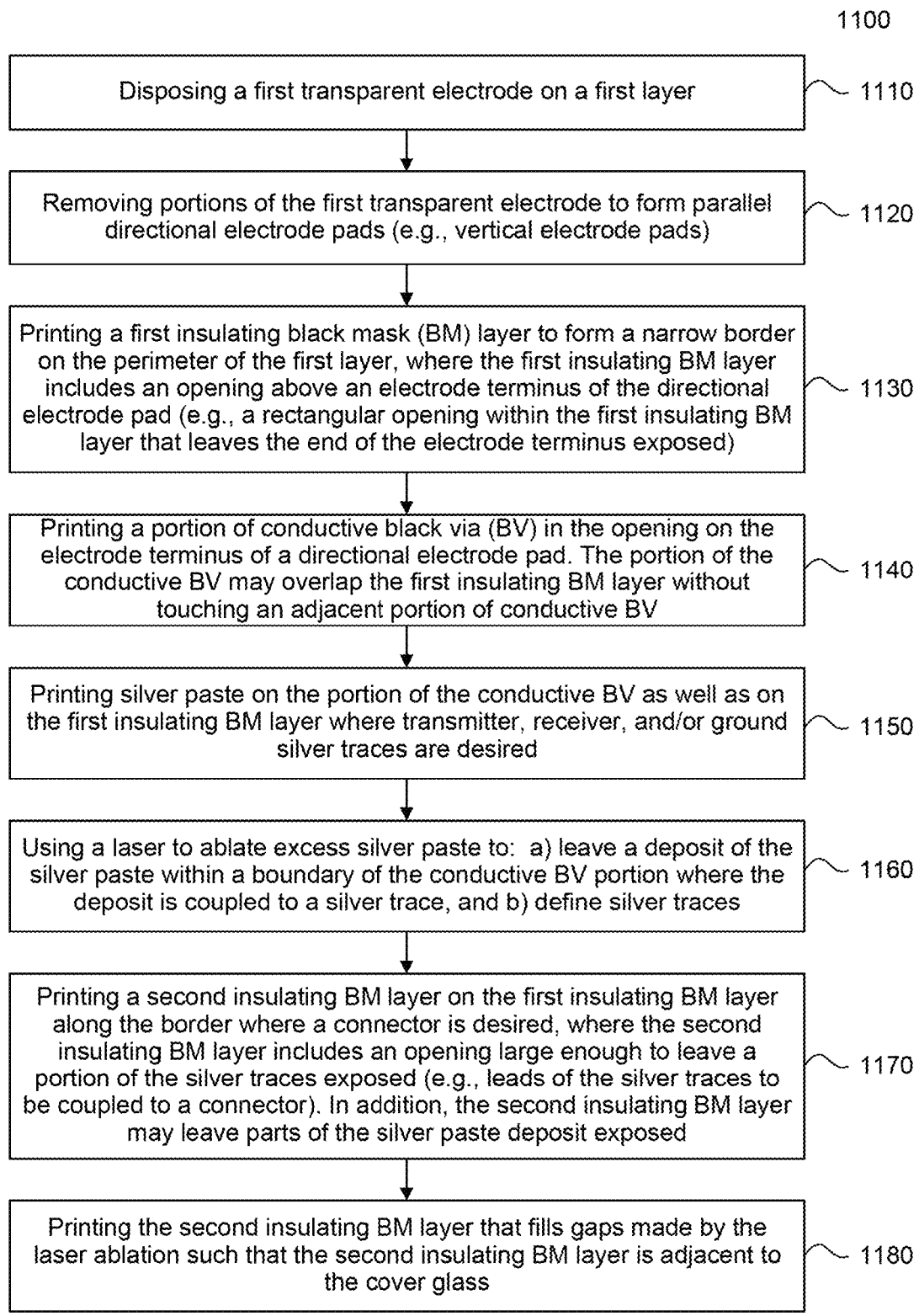
FIG. 11 illustrates an example of a method for fabricating a cover glass assembly, according to an exemplary embodiment of the disclosure.

FIG. 11 illustrates an example of a method 1100 for fabricating a cover glass assembly (e.g., cover glass assembly 600) for a narrow border 130 of PCAP touchscreen 105, according to an exemplary embodiment of the disclosure. For explanation purposes, FIG. 11 may be described with elements from previous figures.

At 1110, method 1100 includes disposing a first transparent electrode on a first layer. For example, method 1100 may include disposing transparent conductor 280 onto cover glass 275.

At 1120, method 1100 includes removing portions of the first transparent electrode to form parallel directional electrode pads (e.g., vertical electrode pads). For example, method 1100 may include removing portions of transparent conductor 280 to produce one or more vertical electrodes 360 on cover glass 275.

At 1130, method 1130 includes printing a first insulating black mask (BM) layer to form a narrow border on the perimeter of the first layer, where the first insulating BM layer includes an opening above an electrode terminus of the directional electrode pad (e.g., a rectangular opening within the first insulating BM layer that leaves the end of the electrode terminus exposed). For example, method 1130 may print first insulating BM layer 410 on the perimeter of cover glass 275, where first insulating BM layer 410 includes opening 420 above an electrode terminus of vertical electrode 360.

At 1140, method 1100 includes printing a portion of conductive black via (BV) in the opening on the electrode terminus of a directional electrode pad. The portion of the conductive BV may overlap the first insulating BM layer without touching an adjacent portion of conductive BV. For example, method 1100 includes printing a portion of conductive BV 460 in opening 420 so that the portion of conductive BV 460 is coupled with an electrode terminus of vertical electrode 360. The portion of conductive BV 460 may exceed opening 420 without touching another portion of conductive BV 460.

At 1150, method 1100 includes printing silver paste on the portion of the conductive BV as well as on the first insulating BM layer where transmitter, receiver, and/or ground silver traces are desired. For example, method 1100 includes printing silver paste 510 on portions of conductive BV 460 as well as on first insulating BM layer 410 where transmitter, receiver, and/or ground silver traces are desired.

At 1160, method 1100 includes using a laser to ablate excess silver paste to: a) define silver traces, and b) optionally leave a deposit of the silver paste within a boundary of a portion of the conductive BV where the deposit is coupled to a silver trace. For example, method 1100 includes using a laser to remove parts of silver paste 510 that are not needed. The laser ablation may remove excess silver paste 510 to define first set of silver traces 560 that may include transmitter, receiver, and/or ground silver traces. In addition, in some embodiments the laser ablation may leave a silver paste deposit 570 on one or more portions of conductive BV 460, where each silver paste deposit 570 is coupled to a silver trace of first set of silver traces 560.

At 1170, method 1100 includes printing a second insulating BM layer on the first insulating BM layer along the border where a connector is desired, where the second insulating BM layer includes an opening large enough to leave a portion of the silver traces exposed (e.g., leads of the silver traces to be coupled to a connector. In addition, the second insulating BM layer may leave parts of the silver paste deposit exposed. For example, method 1100 may include printing second insulating BM layer 610 along narrow border 130 where a connector is desired (e.g., a connector to a flex cable that couples touchscreen 105 to display device 110.) Second insulating BM layer 610 includes opening 620 that leaves a portion of silver paste 510 or first set of silver traces 560 exposed.

At 1180, method 1100 includes printing the second insulating BM layer that fills openings made by the laser ablation such that the second insulating BM layer is adjacent to the cover glass. For example, method 1100 may include printing second insulating BM layer 610 to fill gaps 565' or equivalent.

Figure 12:
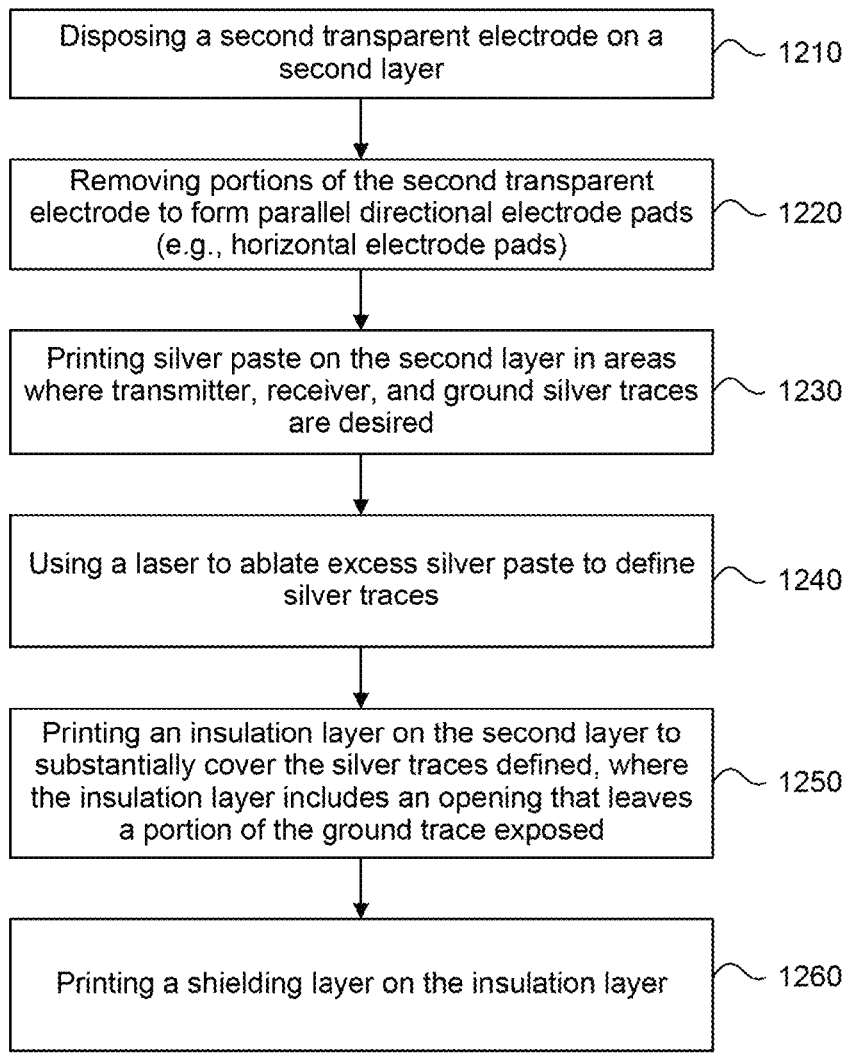
FIG. 12 illustrates an example of a method for fabricating a sensor glass assembly, according to an exemplary embodiment of the disclosure.

FIG. 12 illustrates an example of a method 1200 for the fabrication of a sensor glass assembly 950 for a narrow border 130 of PCAP touchscreen 105, according to an exemplary embodiment of the disclosure. For explanation purposes, FIG. 12 may be described with elements from previous figures.

At 1210, method 1200 includes disposing a second transparent electrode on a second layer. For example, method 1200 may include disposing transparent conductor 285 on sensor glass 290.

At 1220, method 1200 includes removing portions of the second transparent electrode to form parallel directional electrode pads (e.g., horizontal electrode pads). For example, method 1200 may include removing portions of transparent conductor 285 to form second electrodes or horizontal electrodes 760 on sensor glass 290.

At 1230, method 1200 includes printing silver paste on the second layer in areas where transmitter, receiver, and/or ground silver traces are desired. For example, method 1200 may include printing silver paste 810 on areas of sensor glass 290 where transmitter, receiver, and/or ground silver traces are desired.

At 1240, method 1200 includes using a laser to ablate excess silver paste to define silver traces. For example, method 1200 may include using a laser to ablate portions of silver paste 810 to define second set of silver traces 860 that may include transmitter, receiver, and/or ground silver traces.

At 1250, method 1200 includes printing an insulation layer on the second layer to substantially cover the silver traces defined, where the insulation layer includes an opening that leaves a portion of the ground silver trace exposed. For example, method 1200 includes printing an insulation layer 910 on sensor glass 290 that substantially covers second set of silver traces 860 that may include transmitter, receiver, and/or ground silver traces. Insulation layer 910 may include opening 915 that leaves ground silver trace 930 of silver paste 810 exposed.

At 1260, method 1200 includes printing a shielding layer on the insulation layer. For example, method 1200 may include printing shielding layer 960 on insulation layer 910 where shielding layer 960 is coupled to ground silver trace 930 due to opening 915.

Figure 13:
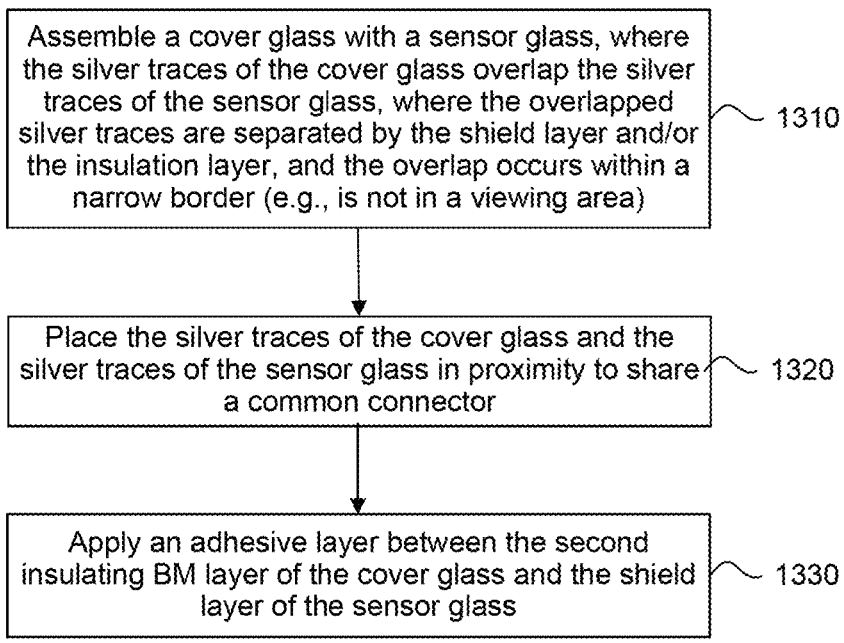
FIG. 13 illustrates an example of a method for combining a cover glass assembly and a sensor glass assembly, according to an exemplary embodiment of the disclosure.

FIG. 13 illustrates an example of a method 1300 for combining a cover glass assembly and a sensor glass assembly, according to an exemplary embodiment of the disclosure. For explanation purposes, FIG. 13 may be described with elements from previous figures.

At 1310, method 1300 includes assembling a cover glass with a sensor glass, where the silver traces of the cover glass overlap the silver traces of the sensor glass, where the overlapped silver traces are separated by the shield layer and the insulation layer, and the overlap occurs within a narrow border (e.g., is not in a viewing area). For example, method 1300 may include combining cover glass assembly 600 with sensor glass assembly 990, where first set of silver traces 560 substantially overlap second set of silver traces 860$y$, where the overlapped silver traces are separated by shield layer 960$y$ and/or insulation layer 910$y$. The overlapped silver traces are: located within second insulating BM layer 610; within narrow border 130; and not within view area 152 of FIG. 1C.

At 1320, method 1300 places the silver traces of the cover glass and the silver traces of the sensor glass in proximity to share a common connector. For example, method 1300 may place first set of silver traces 560 or silver paste 510 in proximity with second set of silver traces 860$y$ to share a common connector.

At 1330, method 1300 applies an adhesive layer between the second insulating BM layer of the cover glass and the shield layer of the sensor glass. For example, method 1300 may include applying adhesive 283 between cover glass assembly 600 and sensor glass assembly 990. In another example, adhesive 283 may be between second insulating BM layer 610 and shield layer 960$y$.

Figure 14:
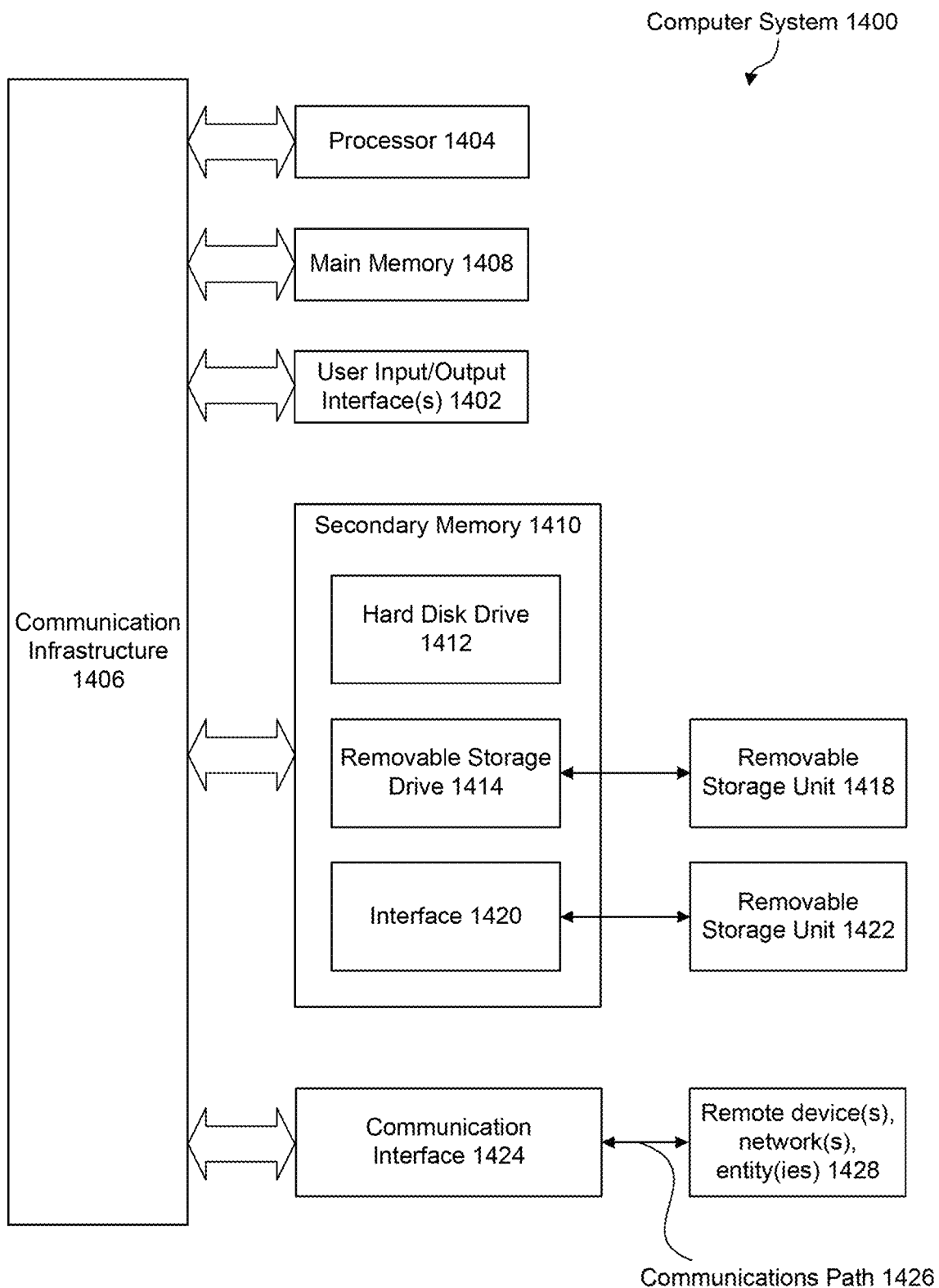
FIG. 14 illustrates an example computer system useful for implementing and/or using various embodiments.

Various embodiments can be implemented, for example, using one or more well-known computer systems, such as computer system 1400 shown in FIG. 14. Computer system 1400 can be any well-known computer capable of performing the functions described herein such as PCAP touchscreen 105 of FIG. 1 and/or display device 110. Computer system 1400 may be internal or external to PCAP touchscreen 105 and/or display device 110 as discussed above.

For example, portions of computer system 1400 may be included as PCAP touchscreen 105 and/or display device 110. In addition, PCAP touchscreen 105 may be used in conjunction with another computer system 1400. In another example, computer system 1440 may be used to perform methods 1100, 1200, and/or 1300 described in FIGS. 11-13.

Computer system 1400 includes one or more processors (also called central processing units, or CPUs), such as a processor 1404. Processor 1404 is connected to a communication infrastructure or bus 906. One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 900 also includes user input/output device(s) such as monitors, keyboards, pointing devices, etc., that communicate with communication infrastructure 1406 through user input/output interface(s) 1402.

Computer system 1400 also includes a main or primary memory 1408, such as random access memory (RAM). Main memory 908 may include one or more levels of cache. Main memory 1408 has stored therein control logic (i.e., computer software) and/or data. Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired, and/or wireless, and which may include any combination of LANs, WANs, the Internet, etc. Control logic and/or data may be transmitted to and from computer system 1400 via communication path 1426.

In an embodiment, a tangible, non-transitory apparatus or article of manufacture comprising a tangible computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 14. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A method for fabricating a projected capacitive (PCAP) touchscreen, comprising:
    assembling a cover glass with a sensor glass, wherein a first set of silver traces of the cover glass overlap a second set of silver traces of the sensor glass, wherein the overlapped first and second sets of silver traces are separated by a shield layer and an insulation layer, wherein the overlap occurs within a border, and wherein the first and second sets of silver traces share a common connector; and
    applying an adhesive between a first insulating black mask (BM) layer of the cover glass and the shield layer.

2. The method of claim 1, further comprising:
    disposing on the cover glass, a first transparent electrode;
    printing a second insulating BM layer on the cover glass, wherein the second insulating BM layer includes a first opening above an electrode terminus of the first transparent electrode; and
    printing a portion of a conductive black via (BV) in the first opening, wherein the portion of the conductive BV is coupled to the electrode terminus and coupled to a first silver trace of the first set of silver traces.

3. The method of claim 2, further comprising:
    printing a silver paste on the portion of the conductive BV and on the second insulating BM layer where transmitter and receiver silver traces are desired; and
    using a laser to ablate excess silver paste.

4. The method of claim 3 wherein the using the laser to ablate the excess silver paste comprises:
    leaving a deposit of the silver paste within a boundary of the portion of the conductive BV wherein the deposit is coupled to the first silver trace; and
    defining remaining silver traces of the first set of silver traces.

5. The method of claim 3, wherein the using the laser to ablate the excess silver paste comprises:
    creating a gap through the silver paste and the second insulating BM layer to the cover glass, wherein the first insulating BM layer fills the gap.

6. The method of claim 5, further comprising:
    printing the first insulating BM layer that covers the first set of silver traces except a second opening that exposes leads of the first set of silver traces to be coupled with the common connector.

7. The method of claim 1, further comprising:
    disposing on the sensor glass, a second transparent electrode;
    printing a second silver paste on the sensor glass where transmitter and receiver silver traces are desired; and
    using a laser to ablate excess second silver paste.

8. The method of claim 7, further comprising printing the insulation layer to substantially overlap the second set of silver traces within the border, wherein the shield layer is printed on the insulation layer.

9. The method of claim 8, wherein the printing the second silver paste on the sensor glass comprises printing a ground silver trace; and wherein the printing the insulation layer comprises printing the insulation layer around a second opening that exposes the ground silver trace to the shield layer.

10. The method of claim 1, wherein the adhesive is a solid optically clear adhesive (OCA) comprising: an acrylic-based adhesive, a silicone-based adhesive, polyvinyl butyral (PVB), or ethylene-vinyl acetate (EVA).

11. A projected capacitive (PCAP) touchscreen, comprising:
    a cover glass assembled with a sensor glass, wherein a first set of silver traces of the cover glass overlap a second set of silver traces of the sensor glass, wherein the overlapped first and second sets of silver traces are separated by a shield layer and an insulation layer, wherein the overlap occurs within a border of the PCAP touchscreen, and wherein the first and second sets of silver traces share a common connector; and an adhesive applied between a first insulating black mask (BM) layer of the cover glass and the shield layer.

12. The PCAP touchscreen of claim 11, further comprising:
the cover glass comprising a first transparent electrode;
a second insulating black mask (BM) layer on the cover glass, wherein the second insulating BM layer includes a first opening above an electrode terminus of the first transparent electrode; and
a portion of a conductive black via (BV) in the first opening, wherein the portion of the conductive BV is coupled to the electrode terminus and coupled to a first silver trace of the first set of silver traces.

13. The PCAP touchscreen of claim 12, further comprising:
a silver paste printed on the portion of the conductive BV and on the second insulating BM layer where transmitter and receiver silver traces are desired; and
excess silver paste ablated by a laser.

14. The PCAP touchscreen of claim 13, wherein the laser ablation of the excess silver paste comprises:
a deposit of the silver paste within a boundary of the portion of the conductive BV wherein the deposit is coupled to the first silver trace; and
remaining silver traces of the first set of silver traces.

15. The PCAP touchscreen of claim 13, wherein the laser ablation of the excess silver paste comprises:
a gap through the silver paste and the first insulating BM layer to the cover glass, wherein the first insulating BM layer fills the gap.

16. The PCAP touchscreen of claim 15, wherein the first insulating BM layer covers the first set of silver traces except a second opening that exposes leads of the first set of silver traces to be coupled with the common connector.

17. The PCAP touchscreen of claim 11, further comprising:
the sensor glass parallel to the cover glass, comprising a second transparent electrode coupled to a second silver trace of the second set of silver traces;
a second silver paste printed on the sensor glass where transmitter and receiver silver traces are desired; and
excess second silver paste ablated by a laser.

18. The PCAP touchscreen of claim 17, further comprising the insulation layer printed to substantially overlap the second set of silver traces within the border of the PCAP touchscreen, wherein the shield layer is printed on the insulation layer.

19. The PCAP touchscreen of claim 18, wherein the silver paste printed on the sensor glass comprises a ground silver trace; and wherein the insulation layer is printed around a second opening that exposes the ground silver trace to the shield layer.

20. The PCAP touchscreen of claim 11, wherein the adhesive is a solid optically clear adhesive (OCA) comprising: an acrylic-based adhesive, a silicone-based adhesive, polyvinyl butyral (PVB), or ethylene-vinyl acetate (EVA).

* * * * *